(12) United States Patent
Wang et al.

(10) Patent No.: US 10,838,967 B2
(45) Date of Patent: Nov. 17, 2020

(54) EMOTIONAL INTELLIGENCE FOR A CONVERSATIONAL CHATBOT

(71) Applicant: Microsoft Technology Licensing, LLC, Redmond, WA (US)

(72) Inventors: Ying Wang, Bellevue, WA (US); Qi Yao, Bellevue, WA (US); Maria Alexandropoulou, Kirkland, WA (US); Konstantinos Aisopos, Kirkland, WA (US); Di Li, Beijing (CN); Oussama Elachqar, Seattle, WA (US); Emmanouil Koukoumidis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 15/617,093

(22) Filed: Jun. 8, 2017

(65) Prior Publication Data

US 2018/0357286 A1 Dec. 13, 2018

(51) Int. Cl.
*G06F 16/00* (2019.01)
*G06F 7/00* (2006.01)
(Continued)

(52) U.S. Cl.
CPC ...... *G06F 16/24575* (2019.01); *G06F 16/243* (2019.01); *G06F 16/24578* (2019.01);
(Continued)

(58) Field of Classification Search
CPC ............. G06F 16/24578; G06F 16/156; G06F 16/248; G06F 16/338; G06F 16/438;
(Continued)

(56) References Cited

U.S. PATENT DOCUMENTS 8,380,794 B2   2/2013   Chakra et al.
2008/0059393 A1   3/2008   Lee et al.
(Continued)

FOREIGN PATENT DOCUMENTS

CN   104091153 A   10/2014

OTHER PUBLICATIONS

"Emotibot", http://www.emotibot.com/web/English.html, Retrieved on: Jan. 19, 2017, 8 pages.
(Continued)

*Primary Examiner* — Usmaan Saeed
*Assistant Examiner* — Raquel Perez-Arroyo
(74) *Attorney, Agent, or Firm* — Schwegman Lundberg & Woessner, P.A.

(57) ABSTRACT

A system provides emotionally and intellectually relevant responses to user queries received by a chatbot instantiated by a computing device. The system also receives user data associated with the user query. The user query is communicated to a first supervised machine learning model to obtain a first plurality of ranked responses. The system also communicates the received user data to a second supervised machine learning model to obtain a first plurality of emotions associated with the user data. The system then determines determine a second plurality of emotions for the first plurality of responses and re-ranks the first plurality of responses based on a comparison of the first plurality of emotions and the second plurality of emotions. The system then selects a response to the user query from the re-ranked responses and outputs the selected response using the chatbot instantiated by the computing device.

20 Claims, 11 Drawing Sheets

(51) Int. Cl.

| | |
|---|---|
| *G06F 16/2457* | (2019.01) |
| *G10L 25/63* | (2013.01) |
| *G06N 3/00* | (2006.01) |
| *G06N 20/00* | (2019.01) |
| *G06F 16/242* | (2019.01) |
| *G06F 16/9535* | (2019.01) |
| *G06N 20/20* | (2019.01) |
| *G10L 15/22* | (2006.01) |
| *G06K 9/62* | (2006.01) |
| *G06F 16/332* | (2019.01) |
| *G06K 9/46* | (2006.01) |
| *G06F 40/30* | (2020.01) |
| *G06K 9/00* | (2006.01) |

(52) U.S. Cl.
CPC ...... *G06F 16/3329* (2019.01); *G06F 16/9535* (2019.01); *G06F 40/30* (2020.01); *G06K 9/46* (2013.01); *G06K 9/6267* (2013.01); *G06N 3/006* (2013.01); *G06N 20/00* (2019.01); *G06N 20/20* (2019.01); *G10L 15/22* (2013.01); *G10L 25/63* (2013.01); *G06K 9/00302* (2013.01); *G06K 9/00885* (2013.01); *G10L 2015/227* (2013.01)

(58) Field of Classification Search
CPC .... G06F 16/638; G06F 16/738; G06F 16/838; G06F 16/9038; G06F 16/331
USPC .......................................................... 707/723
See application file for complete search history.

(56) References Cited

U.S. PATENT DOCUMENTS

| | | | |
|---|---|---|---|
| 2008/0096533 | A1 | 4/2008 | Manfredi et al. |
| 2010/0332842 | A1 | 12/2010 | Kalaboukis et al. |
| 2012/0179751 | A1* | 7/2012 | Ahn .................. G06Q 30/0282 709/204 |
| 2013/0152000 | A1* | 6/2013 | Liu ........................ G06F 3/048 715/765 |
| 2015/0286698 | A1 | 10/2015 | Gagnier et al. |
| 2016/0300570 | A1* | 10/2016 | Gustafson ............... G10L 25/51 |
| 2016/0342683 | A1 | 11/2016 | Lim et al. |
| 2017/0193997 | A1* | 7/2017 | Chen .................. G10L 15/1822 |
| 2017/0223092 | A1* | 8/2017 | Subramanian ...... H04L 65/1089 |

OTHER PUBLICATIONS

Hannam, Chris, "Build a Sentiment Analysis Slack Chatbot in Python", http://blog.algorithmia.com/sentiment-analysis-slack-chatbot-python/, Published on: Sep. 7, 2016, 20 pages.

Davidson, Jordan, "Facebook Messenger Chatbot, Joy, Wants to Help People Improve Their Mental Health", https://themighty.com/2016/07/facebook-messenger-chatbot-joy-wants-to-help-improve-mental-health/, Published on: Jul. 27, 2016, 9 pages.

Majumdar, Nivedit, "Can Bots double up as Mood Trackers?", http://emberify.com/blog/chat-bots-mood-trackers/, Published on: May 16, 2016, 19 pages.

"Automate the repetitive. Focus on the important", http://twitch.moobot.tv/, Retrieved on: Jan. 19, 2017, 3 pages.

Stott, Lee, "Creating my first ChatBot using Microsoft Cognitive Services and Python", https://blogs.msdn.microsoft.com/uk_faculty_connection/2016/11/28/creating-my-first-chatbot-using-microsoft-cognitive-services-and-python/, Published on: Nov. 28, 2016, 40 pages.

Bommel, Edwin Van, "Can Bots Have Feelings?", http://www.ipsoft.com/2016/12/08/can-bots-have-feelings/?lg=jp, Published on: Dec 8, 2016, 4 pages.

* cited by examiner

EMOTIONAL INTELLIGENCE FOR A CONVERSATIONAL CHATBOT

TECHNICAL FIELD

Example embodiments of the present application generally relate to providing an emotional intelligence to a conversational chatbot and, in particular, to determining various emotional states using one or more signals provided by and/or obtained from a user, and then using the determined emotional states to provide answers to user queries that are contextually and emotionally relevant.

BACKGROUND

A chatbot is a computer program designed to simulate conversation with a human user or operator. Typically, the chatbot has access to a database of answers or typically responses to the human user providing a query. The answers or responses are often intellectually relevant to the query; meaning, the answers or responses typically provide a satisfactory answer that is logically reasonable to the provided query. However, as the chatbot merely provides the answers to the user query, the chatbot typically does not have a mechanism to emphasize or emotionally relate to the user. Thus, while a given response or answer may be intellectually relevant, it may be emotionally deficient. This deficiency can lead to the user or human operator from turning away from the chatbot or being dissuaded from using the chatbot in future interactions. As chatbots or, in some circumstances, conversational personal assistants are becoming more prevalent in computing devices, the user or human operator may be dissuaded from using the computing device if he or she knows that the emotionally deficient chatbot or conversational personal assistant is present. Thus, the chatbot or conversational personal assistant should emotionally connect with the user or human operator to further encourage the user or human operator to the use the computing device and engage with the chatbot or conversational personal assistant.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
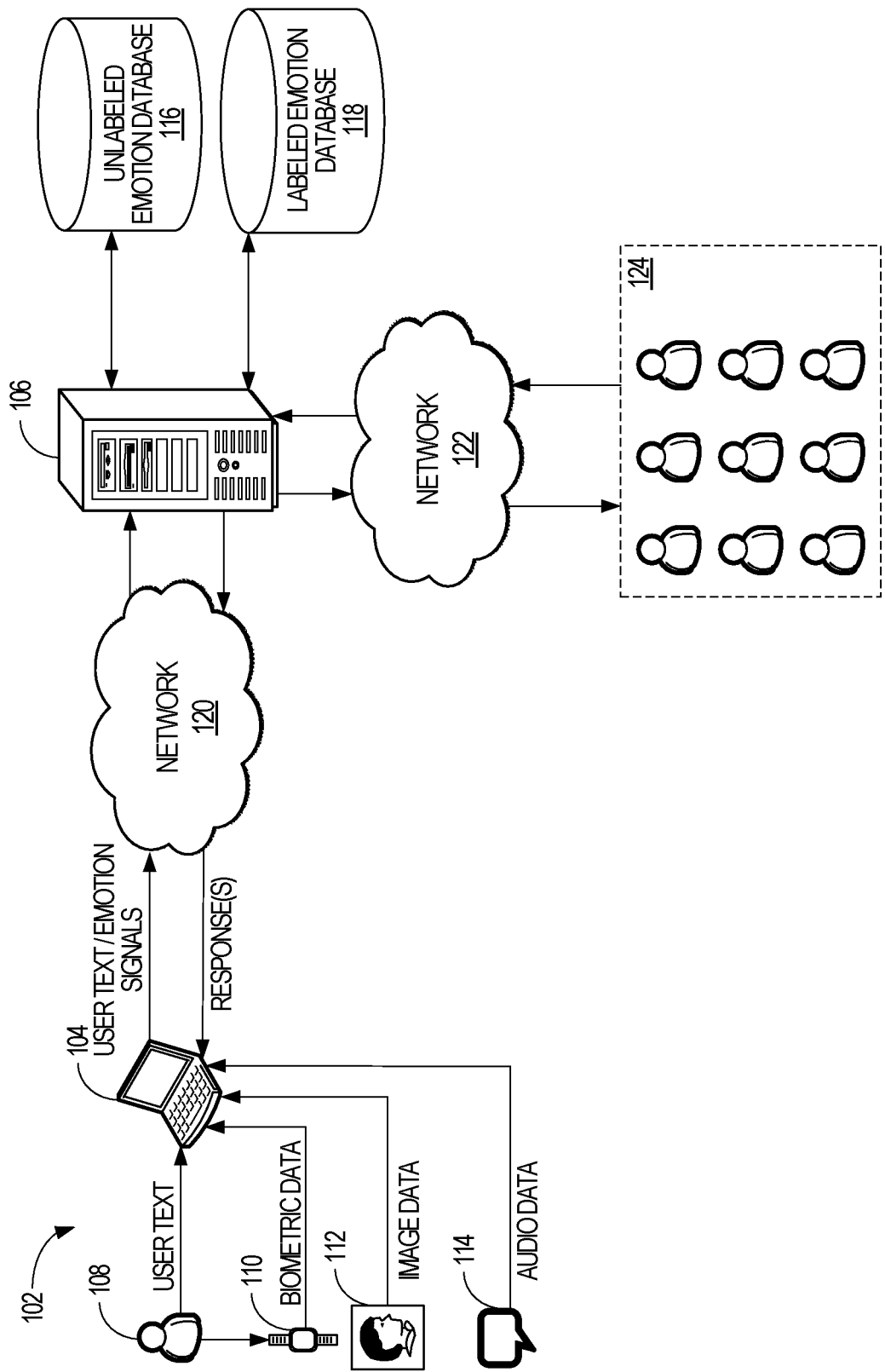
FIG. 1 is an architecture diagram illustrating a client device in communication with an emotional intelligence determination server, in accordance with an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve systems and methods for instantiating an emotional relevant conversational chatbot. In various embodiments, the disclosed emotional chatbot continuously tracks a given user's emotions using a multimodal emotion detection approach that includes determining the user's emotions from a variety of signals including, but not limited to, biometric data, voice data (e.g., the prosody of the user's voice), content/text, one or more camera images, one or more facial expressions, and other such sources of contextual data. In addition, contextual data may include the user's location, the time of day and/or calendar day, the weather where the user is located, whether the user is among other persons, and/or the user's habits and/or patterns.

While the disclosed systems and methods engage in the acquisition of user data, this disclosure contemplates that various embodiments anonymize and/or remove personally identifying information that may identify a unique user. Thus, when the user engages the emotional relevant conversational chatbot, the conversational chatbot may remove information that may personally identify the user, such as the user's alias, the user's username, the user's real name (if the user's real name is associated with the user's profile), any location information, and other such personally identifiable information.

Additionally, and/or alternatively, the emotional relevant conversational chatbot may include one or more opt-in and/or opt-out mechanisms that allow the user to actively select and participate in the type of information that the conversational chatbot may obtain about the user. For example, the conversational chatbot may display a prompt (or other message) that instructs the user to select the type of information that the conversational chatbot may obtain about the user. As another example, the conversational chatbot may display a prompt (or other message) that instructs the user to select the type of information that the conversational chatbot may not obtain about the user. In this manner, the user is an active participant in the type of information that the conversational chatbot may obtain about the user and must authorize (either explicitly via opt-in or implicitly via opt-out) the conversational chatbot about the type of user information that the conversational chatbot obtains. Without the authorization from the user, the emotional chatbot may obtain a de minimis amount of user data, such as the words and/or phrases used in the query or command to the emotional chatbot.

In interacting with the user, the conversational chatbot is configured to obtain a determination of (or determine on its own), the emotional state of the user. In one embodiment, when the conversational chatbot receives a message from the user, written, spoken, or otherwise, the conversational chatbot analyzes the message in terms of its emotional content. The conversational chatbot then obtains a set of responses to the message, which it then ranks for response relevance. Using the a predetermined number of most relevant responses, the conversational chatbot then determines the likely emotion exhibited by the most relevant responses, and selects a response that aligns with the determined emotion of the received message and/or user. Thus, the response that the conversational chatbot presents to the user is a response that is both intelligently (e.g., answers the query and/or command presented by the user) and emotionally (e.g., includes a query and/or command having a tone matching the emotional state of the user) relevant.

Further still, the conversational chatbot may be emotionally configurable such that it may be assigned one or more emotional states. In one embodiment, the conversational chatbot includes configurable preferences that relate to "likes" and "dislikes." For example, the configurable preferences may include a favorite movie genre type, a favorite sports team, a strongly disliked movie genre type, and a strongly disliked sports team. Using a network connection (e.g., an Internet connection), the conversational chatbot may be configured to obtain real-world information that relate to these configurable preferences. For example, the conversational chatbot may be programmed with a Uniform Resource Location (URL) of a website to purchase movie tickets or URL of a website that reports on sporting events. The conversational chatbot may be further configured to retrieve information about the favorite movie genre and/or favorite sports team (e.g., using a persistent Internet connection). In response to activities occurring at these websites (e.g., a movie is in theatres that aligns with the favorite movie genre of the conversational chatbot or the favorite sports team wins a match), the conversational chatbot may then be assigned a particular emotional state (e.g., "happy," "joyful," "exuberant," etc.). The conversational chatbot may then further modify responses to a user's query and/or command based on the assigned particular emotional state. For example, and without limitation, the conversational chatbot may introduce words and/or phrases that reflect the assigned emotional state into the response selected for presentation and/or display to the user.

In another embodiment, the conversational chatbot may be assigned an emotional state based on prior interactions with the user. In this embodiment, the conversational chatbot may be configured to determine and maintain an analysis of the history of emotions presented in a user's query and/or command. For example, the conversational chatbot may maintain a history that the last N queries and/or commands (where N≥1) are associated with a predetermined emotion (e.g., "upset") or a predetermined set of emotions (e.g., "upset," "angry," "unhappy,"). Upon reaching a predetermined threshold of prior queries and/or commands having the predetermined emotion or set of emotions, the conversational chatbot may then assign itself an emotional state. This analysis and response allows the conversational chatbot to emotionally respond to the user in a manner consistent with what the user would expect how another person would emotionally respond. In this embodiment, the conversational chatbot may similarly introduce words and/or phrases that reflect the assigned emotional state into the response selected for presentation and/or display to the user.

FIG. 1 is an architecture diagram 102 illustrating a client device 104 in communication with an emotional intelligence determination server 106 in accordance with an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the client device 104 and/or the emotional intelligence determination server 106 to facilitate additional functionality that is not specifically described herein.

While the client device 104 and the emotional intelligence determination server 106 are arranged as a client-server architecture, the disclosed subject matter is, of course, not limited to such an architecture, and could equally well find application in other architectures, such as an event-driven, distributed, or peer-to-peer architecture system. Further, the various functional components of the emotional intelligence determination server 106 may be implemented as standalone systems or software programs, which do not necessarily have networking capabilities. Moreover, it shall be appreciated that although the various functional components of the emotional intelligence determination server 106 are discussed in the singular sense, multiple instances of one or more of the various functional components may be employed.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic system, or any other communication device that a user 108 may use. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

The client device 104 may include one or more applications (also referred to as "apps") such as, but not limited to, an operating system, a web browser, a messaging application, an electronic mail (email) application, and an emotional chatbot configured to provide responses to various queries and/or commands. The emotional chatbot may be further configured to interact with the various applications being executed by the client device 104. The emotional chatbot is also configured to receive one or more queries and/or commands from the user 108, and to display a corresponding response that is intelligently and emotional relevant to the user query and/or command. The user 108 may provide the query and/or command via text using a hardware- or software-based keyboard, via speech using a microphone or other suitable audio input device, or a combination thereof. To provide an emotionally relevant response, the emotional chatbot is further configured to obtain different types of user data and/or information to determine an emotional state of the user 108. The emotional chatbot may also determine an emotional state for itself.

In determining the emotional state of the user 108, the emotional chatbot may acquire user data from a variety of sources. One source of information includes the query and/or command that the user 108 provides. In this regard, where the query and/or command is text, the emotional chatbot leverages the words and/or phrases of the query and/or command to determine the emotional state of the user. Where the query and/or command is speech or voice, the emotional chatbot may use the prosody of the speech, in addition to the words and/or phrases, to determine the emotional state of the user. As discussed below, the client device 104 is configured to send the query and/or command received from the user to the emotional intelligence determination server 106, which determines the potential emotional states of the user 108 and/or potential responses for the client device 104 to communicate and/or display to the user 108.

In addition to using the query and/or command to determine the emotional state of the user 108, the client device 104 may also obtain biometric data from a biometric monitoring device 110 being worn by the user 108, a video and/or image 112 of the user 108 via a camera or other suitable imaging device, audio and/or speech data 114 of the user 108 via a microphone or other audio receiving device, historical and/or a current Global Positioning System (GPS) location, and other such user data and/or information. As explained above, the emotional chatbot may include configurable preferences that the user 108 can configure to authorize the emotional chatbot to obtain such information. Further still, the configurable preferences may be such that the user 108 can also de-authorize the emotional chatbot from having access to such user data and/or information. In this manner, the user 108 can place restrictions and/or prevent the emotional chatbot from obtaining particular sets of user data and/or information.

The obtained user data and/or information each represent a signal for an emotion model maintained by the emotional intelligence determination server 106. As explained with reference to FIG. 3, the emotional model may be implemented within a supervised machine learning algorithm such that the supervised machine learning algorithm generates one or more probabilities for one or more potential emotions associated with the user 108. In this way, the more robust information provided to the emotional intelligence determination server 106, the more likely that the emotional intelligence determination server 106 provides higher probabilities of the current (and correct) emotional state of the user 108.

In one embodiment, the client device 104 communicates with the emotional intelligence determination server 106 via a network 120. The network 120 may include an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The emotional intelligence determination server 106 is configured to receive one or more user queries and/or commands, along with various user data and/or information, and to provide one or more responses that are relevant to the queries and/or commands. The emotional intelligence determination server 106 is also configured to determine the potential emotional states of the user 108 and/or assign an emotional state to the emotional chatbot interacting with the user 108.

In one embodiment, the emotional intelligence determination server 106 and the client device 104 communicate via an application programming interface (API) that provides functions and services for the client device 104 to send emotional data to the emotional intelligence determination server 106. In addition, the client device 104 may configured with a local and/or dedicated API that instructs it to register to receive specific emotion detection events. For example, and without limitation, the client device 104 may register to receive one or more notifications that the user is experiencing a "happy" emotion with a confidence or probability value of 80% (e.g., 0.8) because a designated application running on the client device 104 can consume the signal (e.g., if the user is happy and is out in the mall suggest them to buy a certain product).

Although the client device 104 and the emotional intelligence server 106 are illustrated as being separate entities in FIG. 1, the emotional intelligence server 106 may be instantiated on the client device 104 (or vice versa). Where the emotional intelligence server 106 is instantiated as a background service on the client device 104, the emotional intelligence server 106 registers with the operating system of the client device 104 to receive data from other applications and/or client device 104 modules.

In determining the potential emotional states of the user 108, the emotional intelligence determination server 106 is communicatively coupled to an unlabeled emotion database 116 and a labeled emotion database 118. The unlabeled emotion database 116 includes user data and/or information obtained from the user 108 intended to be used as training date for the supervised machine learning algorithm instantiated by the emotional intelligence determination server 106. Similarly, the labeled emotion database 118 includes labeled user data where the user data is associated with one or more potential emotions. Potential emotions include, but are not limited to, "happy," "sad," "agitated," "angry," "upset," "joyful," "tearful," "depressed," "despair," and other such emotions or combinations of emotions. As known to one of ordinary skill in the art, the labeled user data, such as the historical GPS locations, the current GPS location, the prosody of a given query and/or command, the words and/or phrases used in a particular query and/or command, an image and/or video, are each associated with one or more of the potential emotions.

To obtain the labeled emotion data from the unlabeled emotion data, the emotional intelligence determination server 106 may employ a crowdsourcing tool to distribute the unlabeled emotion data to one or more human operators 124 to indicate the potential emotions associated with the unlabeled emotion data. The emotional intelligence determination server 106 may communicate with the one or more human operators 124 via a network 122, which may include an ad hoc network, an intranet, an extranet, a VPN, a LAN, a WLAN, a WAN, a wireless WAN WWAN, a MAN, a portion of the Internet, a portion of the PSTN, a cellular telephone network, a wireless network, a Wi-Fi® network, a WiMax network, another type of network, or a combination of two or more such networks. One example of a crowdsourcing tool that the emotional intelligence determination server 106 may use is the Amazon Mechanical Turk®, which is available and accessible via the Internet.

The emotional intelligence determination server 106 then uses the labeled emotion data to determine one or more potential emotional states of the user 108 based on a provided query and/or command. Using a similar supervised machine learning algorithm, the emotional intelligence determination server 106 may also determine relevant responses to the provided user query and/or command. Although not germane to this disclosure, one of ordinary skill in the art will appreciate that the potential responses to the user query and/or command may be determined similarly (e.g., via labeled and/or unlabeled user data and a supervised machine learning algorithm) as the emotional state of the user 108. Further still, the emotional intelligence determination server 106 may determine an emotional state of the emotional chatbot. The potential responses to the user query and/or command, along with the potential emotions of the user 108 and/or the emotional state of the emotional chatbot, are then communicated to the client device 104. As discussed below with reference to FIG. 2, the client device 104 may engage in additional processing of the potential responses, the potential emotions of the user 108, and/or the emotional state of the emotional chatbot, to select, determine, and/or generate a response that is most suitable to the provided user query and/or command.

Figure 2:
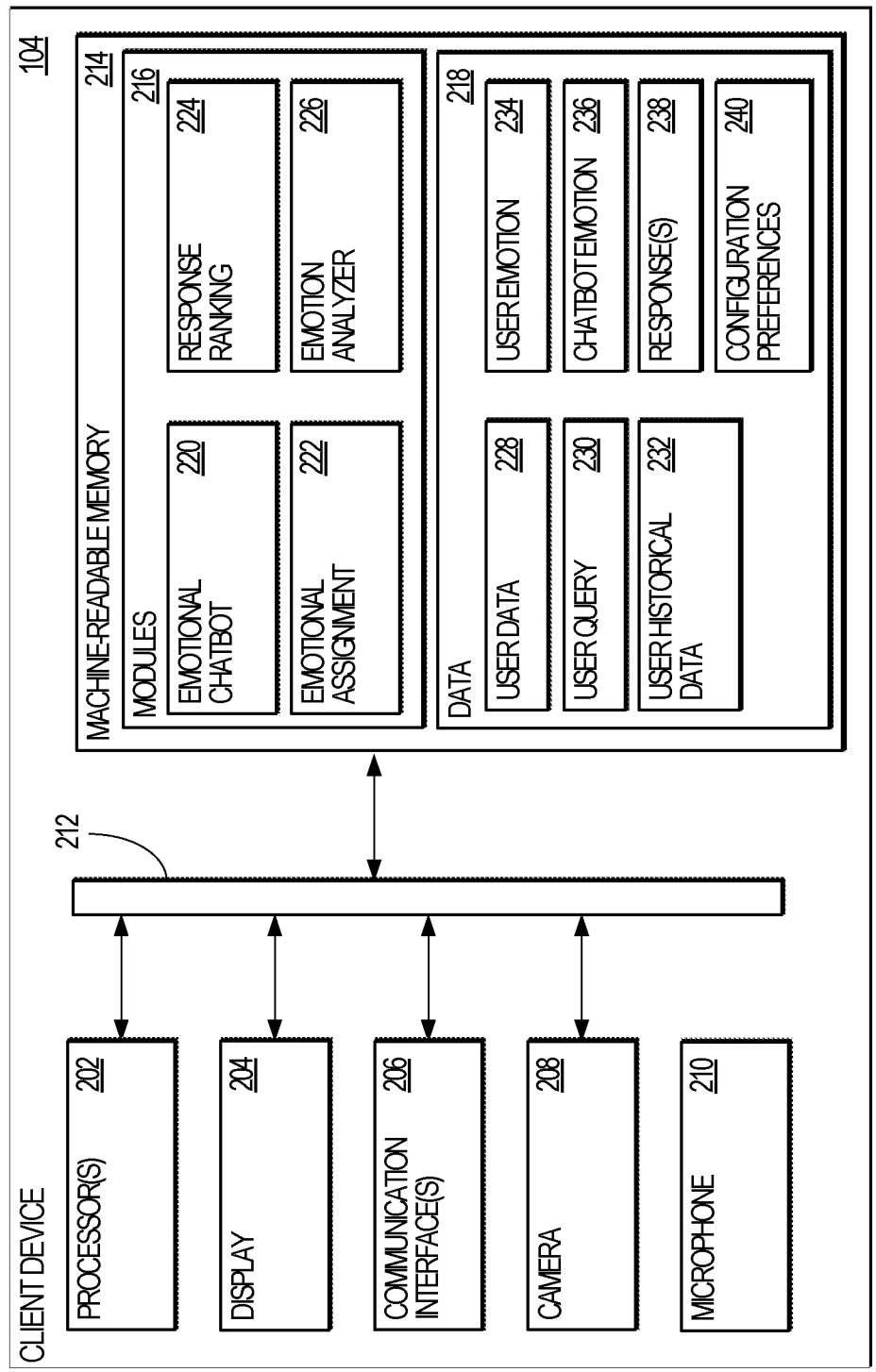
FIG. 2 is a block diagram of the client device of FIG. 1, in accordance with an example embodiment.

FIG. 2 is a block diagram of the client device 104 of FIG. 1, in accordance with an example embodiment. In one embodiment, the client device 104 includes one or more processors 202, a display 204, a communication interface 204, a camera 208, a microphone 210, and a machine-readable memory 214. The client device 104 also includes a communication bus 212 that facilitate communications among the various hardware components 202-210.

The various functional components of the client device 104 may reside on a single computer, or they may be distributed across several computers in various arrangements. The various components of the client device 104 may, furthermore, access one or more databases, and each of the various components of the client device 104 may be in communication with one another. Further, while the components of FIG. 2 are discussed in the singular sense, it will be appreciated that in other embodiments multiple instances of the components may be employed.

The one or more processors 202 may be any type of commercially available processor, such as processors available from the Intel Corporation, Advanced Micro Devices, Texas Instruments, or other such processors. Furthermore, the one or more processors 202 may be of any combination of processors, such as processors arranged to perform distributed computing. In one embodiment, the one or more processors 202 are implemented as hardware processors. In another embodiment, the one or more processors 202 are implemented as software processors.

The display 204 is configured to display information to the user 108, such as a prompt or other input field for a query and/or command, information about authorizing and/or de-authorizing the emotional chatbot to various user information and/or data, one or more response(s) received from the emotional intelligence determination server 106, and other such information relating to interactions with the client device 104. The display 204 may include one or more different types of display such as a Liquid Crystal Display (LCD), a Light Emitting Diode (LED) display, a Cathode Ray Tube (CRT) display, or any other combination of displays now known or later developed.

The one or more communication interface(s) 206 may be configured to send and/or receive communications with the emotional intelligence determination server 106. In this regard, the one or more communication interface(s) 206 may be a wired interface, such as an Ethernet interface, a wireless interface, such as an 802.11g/n interface, or a combination of wired and wireless interfaces.

The camera 208 may be configured to acquire one or more images 112 of the user 108 during interactions with the emotional chatbot. The camera 208 may include one or more cameras and, further, may include one or more different types of cameras. The camera 208 may be a full spectrum camera, an infrared illuminated camera, an infrared camera, a thermal imaging camera, a stereoscopic camera, and/or any other combination of cameras or different types of cameras. In one embodiment, the images 112 acquired by the camera 108 may be communicated to the emotional intelligence determination server 106, which then extracts one or more features from the images 112 to use with an emotion model. As known to one of ordinary skill in the art, the emotional intelligence determination server 106 may use one or more feature extraction algorithms, such as principle component analysis (PCA), gray level co-occurrence matrix (GLCM), scale invariant feature transform (SIFT), PCA-SIFT, speeded up robust features (SURF), and other such feature extraction algorithms or combination of algorithms to extract one or more features from the images 112 and/or videos acquired by the camera 108.

The microphone 210 is configured to acquire the audio data 114 (e.g., speech) from the user 108. Although, in some embodiments, the user 108 may provide a command and/or query to the client device 104 via text, the user 108 may also speak and/or provide the command and/or query via audio signals. Thus, the microphone 210 is configured to acquire these signals, which are then communicated to the emotional intelligence determination server 106 for further processing (e.g., by extracting the prosody associated with the received audio signals). Additionally, and/or alternatively, the client device 104 may perform initial audio processing on the received audio signals (e.g., prosody feature extraction), and then communicates the extracted features to the emotional intelligence determination server 106.

The machine-readable memory 214 includes various modules 216 and data 218 for implementing the features of the client device 104. The machine-readable memory 214 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 212 and the data 214. Accordingly, the machine-readable memory 206 may be implemented as a single storage apparatus or device, or, alternatively and/or additionally, as "cloud-based" storage systems or storage networks that include multiple storage apparatus or devices. As shown in FIG. 2, the machine-readable memory 206 excludes signals per se.

The module(s) 208 may include one or more applications and/or modules 220-226. As is understood by skilled artisans in the relevant computer and Internet-related arts, each of the components 212-220 (e.g., a module or engine) may represent a set of executable software instructions and the corresponding hardware (e.g., memory and processor) for executing the instructions. In one embodiment, the module(s) 216 include an emotional chatbot 220, an emotional assignment module 222, a response ranking module 224, and an emotion analyzer 226. In one embodiment, modules 216 are written in a computer-programming and/or scripting language. Examples of such languages include, but are not limited to, C, C++, C #, Java, JavaScript, Perl, Python, Ruby, or any other computer programming and/or scripting language now known or later developed.

The module(s) 216 may interact with data 218 stored in the machine-readable memory 214, such as user data 228, a user query 230, user historical data 232, and a user emotion 234. The data 218 may also include a determined chatbot emotion 236, one or more potential response(s) 238 to the user text 230, and one or more configuration preferences 240. The various modules 216 and data 218 are discussed below.

As discussed with reference to FIG. 1, the emotional chatbot 220 is configured to interact with the user 108 and provide intelligently and emotionally relevant responses (e.g., response(s) 238) to one or more user queries (e.g., user query 230). Examples of the emotional chatbot 220 include Microsoft® Zo™ and Microsoft® Cortana™, which are both produced by the Microsoft Corporation located in Redmond, Wash.

As the user 108 interacts with the emotional chatbot 220, the user 108 provides one or more queries (e.g., query 230) for the emotional chatbot 220 to answer. The query 230 may be a text-based query (e.g., entered via a hardware- and/or software-based keyboard) or a speech-based query (e.g., provided via the microphone 210). The query 230 may also be a natural language query, where the query 230 is a grammatically correct question or command, written or spoken in a language that is also used to communicate verbally, such as English, German, French, and so forth. Examples of query 230 include "What is the weather like in Spokane?," "What movie is playing in my area?," and "Read that back to me." Thus, the query 230 represents a more natural way for the user 108 to interact with the emotional chatbot 220 and, by extension, the client device 104. Upon receipt of the user query 230, the emotional chatbot 220 may also acquire additional user data 228.

In one embodiment, the user data 228 includes information obtained from one or more sources of data and/or one or more of the components 202-210 of the client device 104. From a component perspective, the user data 228 may include image data 112 acquired via the camera 208 and/or audio data 114 (e.g., speech) acquired via the microphone 210. Sources of additional user data may include a biometric device 110 communicatively coupled to the client device 104 via one or more of the communication interface(s) 206. As with the image data 112 and/or the audio data 114 acquired via the microphone 210, the biometric data may also be communicated to the emotional intelligence determination server 106 to be used as one or more signals for the emotional model.

In addition, the user data 228 may include user information obtained from one or more online services that have a publicly accessible application programming interface (API) for accessing such user information. In these instances, the emotional chatbot 220 may prompt or query the user 108 to update or modify the configuration preferences 240 to expressly allow the emotional chatbot 220 to obtain this user data.

Finally, the user data 228 may include time information, such as the day, date, and/or time. As with the other user data, the emotional chatbot 220 may communicate the time information to the emotional intelligence determination server 106, which may then select one or more response(s) to the user query 230 based on the provided time information. In this manner, the time information forms basis for yet another signal to the emotional model in determining an emotional state of the user 108.

The emotional assignment module 222 is configured to assign a chatbot emotion to 236 to the emotional chatbot 220. In one embodiment, the emotional assignment module 222 is configured to assign an emotional state to the emotional chatbot 220 based on the user historical data 232. In this regard, the user historical data 232 may include a record of prior user queries and/or determined emotions associated with such user queries. Depending on the number of user queries associated with a predetermined emotion (e.g., the number of user queries associated with a predetermined emotion exceed a predetermined threshold), the emotional assignment module 222 may assign a corresponding emotion to the emotional chatbot 220. For example, where a first threshold is established that five prior "angry" queries are associated with a "hurt" emotion, and the historical data 232 indicates that the user queries include six queries, each associated with the "angry" emotional state, the emotional assignment module 222 may then assign the "hurt" emotion as the chatbot emotion 236 for the emotional chatbot 220. Additionally, and/or alternatively, the threshold may be established as a percentage of prior queries (e.g., that the last 20% of queries are associated with a predetermined emotion) or the threshold may be established based on the time in which the queries are received (e.g., a predetermined number of queries associated with a particular emotion over a predetermined period of time).

Additionally, and/or alternatively, the emotional assignment module 222 may reference the configuration preferences 240 to assign a particular emotion to the emotional chatbot 220. In one embodiment, the configuration preferences 240 include one or more predetermined conditions which, when satisfied, cause the emotional assignment module 222 to assign a particular emotion as the chatbot emotion 236. For example, a predetermined condition may state that, when the weather and/or forecast indicates rain (obtained via the communication interface(s) 206), that the emotional assignment is to select the emotion of "sad" as the chatbot emotion 236. As another example, another condition may state that, when a particular sports team wins a game (which the emotional chatbot 220 can determine by obtaining this data from a URL via the communication interface(s) 206), that the emotional assignment 222 selects a "happy" emotion as the chatbot emotion 236. In this manner, the configuration preferences 240 affect the type of emotion assigned to the emotional chatbot 220. In one embodiment, the emotional chatbot 220 obtains this contextual data when the user 108 instantiates a session with the emotional chatbot 220. In another embodiment, the emotional chatbot 220 obtains this contextual data at predetermined time intervals (e.g., an active polling technique) while the emotional chatbot 220 is instantiated by the client decide 104. A combination of the foregoing embodiments is also possible.

The response ranking module 224 is configured to rank, and/or re-rank, the response(s) 238 to the user query 230, where the response(s) are determined by the emotional intelligence determination server 106. In one embodiment, the response ranking module 224 is configured to initially rank the response(s) 238 according to the relevancy of the response when compared with the user query 230. Additionally, and/or alternatively, the response(s) 238 are already associated with a determined rank when the client device 104 receives such response(s) 238 from the emotional intelligence determination server 106.

Although the response(s) 238 may be associated with an initial set of rankings, the response ranking module 224 is further configured to re-rank the response(s) according to an emotion determined from, and/or associated with, each of the response(s) 238. Accordingly, in one embodiment, the response ranking module 224 may invoke and/or instantiate the emotion analyzer 226, which analyzes the received response(s) 238 to determine one or more emotion(s) associated with each of the response(s) 238. In one embodiment, the emotion analyzer 226 may determine the one or more emotions associated with each of the response(s) 238. The emotion analyzer 226 may be implemented as an unsupervised or supervised machine learning-based model, such as a support vector machine (SVM), a Bayesian classifier (naïve or otherwise), a k-nearest neighbor classifier, or any other such machine learning implementation or combinations thereof. One example of a machine learning-based model is disclosed in Prakash et al., "Emulating Human Conversations using Convolutional Neural Network-based IR," Neu-IR'16 SIGIR Workshop on Neural Information Retrieval, 2016 ("Prakash"), the disclosure of which is hereby incorporated by reference in its entirety.

Additionally, and/or alternatively, the emotion analyzer 226 may communicate the response(s) 238 to the emotional intelligence determination server 106 to determine the one or more emotion(s) associated with each of the response(s) 238, such as by providing the response(s) 238 as input to the emotional model. In one embodiment, the emotion(s) determined for each of the response(s) 238 is associated with a probability, or likelihood, value that ranges between 0 and 1, inclusive, that the associated response represents the corresponding emotion. As one example, a selected response may have the following probabilities and emotions: 0.8:"sad"; 0.4:"depressed"; and, 0.3:"upset."

Using the determined emotion(s) associated with each of the response(s) 238, the response ranking module 224 then re-ranks each of the response(s) 238. In one embodiment, the response ranking module 224 is configured to rank the responses according to the probabilities associated with each of the determined emotion(s) as determined by the emotion analyzer 226. For example, if a first response, ranked initially as first, is associated with the probability/emotion of 0.8:"sad" and a second response, ranked initially as second, is associated with the probability/emotion 0.9:"upset," the response ranking module 224 re-ranks the second response higher than the first response because the probability associated with "upset" is greater than the probability associated with "sad." Thus, in this example, the second response is re-ranked as the first (or best) response. In the event of a tie (e.g., two responses are determined as exhibiting an emotion with the same probability value), the response ranking module 224 may reference a probability value associated with a second emotion or a probability value associated with a third emotion. Where a second or third emotion is not associated with either of the tied responses, the response ranking module 224 may maintain the ranking of the responses such that the responses continue to be associated with their initial ranking.

Additionally, and/or alternatively, the response ranking module 224 may rank (or re-rank) the responses 238 according to their determined emotions when compared with the user emotion 234 and/or the chatbot emotion 236. In one embodiment, the emotional chatbot 220 may maintain one or more clusters of emotions such that one or more emotions are considered equivalent and/or similar. For example, the emotional clusters may include a first emotional cluster that has such emotions as "sad," "depressed," "despair," "unhappy," and other such emotions, and a second emotional cluster may have such emotions as "happy," "joyful," "excited," "jolly," and other such emotions. Thus, when a set of emotions are determined for a set of response(s) 238, the determined emotions can be compared with the user emotion 234 and/or the chatbot emotion 236, and the response ranking module 224 ranks those responses higher where their corresponding emotions are determined to be similar to (e.g., within the same cluster) as the user emotion 234 and/or the chatbot emotion 236. In performing this ranking, the response ranking module 224 may first rank the response(s) 238 according to whether their corresponding emotions are similar to the user emotion 234 and/or chatbot emotion 236, and then according to the probability associated with such emotions. In this embodiment, there may be a scenario where a first response is associated with an emotion having a high probability (e.g., 0.9) and a second response is associated with an emotion having a lower probability (e.g., 0.8), but the second response is ranked (or re-ranked) as being higher than the first response because the emotion associated with the second response is determined as being similar to the user emotion 234 and/or chatbot emotion 236.

In yet another embodiment, probabilities of the emotions associated with the responses 238 that are determined as being similar to the user emotion 234 are multiplied with a first predetermined weighting factor and probabilities of the emotions that are determined as being similar to the chatbot emotion 236 are multiplied with second predetermined weight factor. Where the emotion of a selected response is not similar to the user emotion 234 and/or chatbot emotion 236, there may be no weighting factor applied. Furthermore, the first and second weighting factors may be different, such that the first weighting factor is greater than the second weighting factor (or vice versa). Thereafter, the response(s) 238 are then ranked according to their assigned probabilities. In this manner, emotion(s) that are determined as being similar to the user emotion 234 and/or chatbot emotion 236 are weighted more heavily than those emotions that are not similar.

Having re-ranked the response(s) 238 according to the determined emotion(s), the emotional chatbot 220 then selects the response 238 having the highest rank (e.g., having the highest probability associated with a corresponding emotion with or without a weighting factor applied). The selected response may then be communicated to the user 108 visually (e.g., via the display 204) or aurally (e.g., via one or more speakers (not shown)). Thus, by leveraging the user emotion 234, the chatbot emotion 236, and the various modules 222-226, the emotional chatbot 220 provides a response to the user query 230 that is both intelligently and emotionally relevant.

Figure 3:
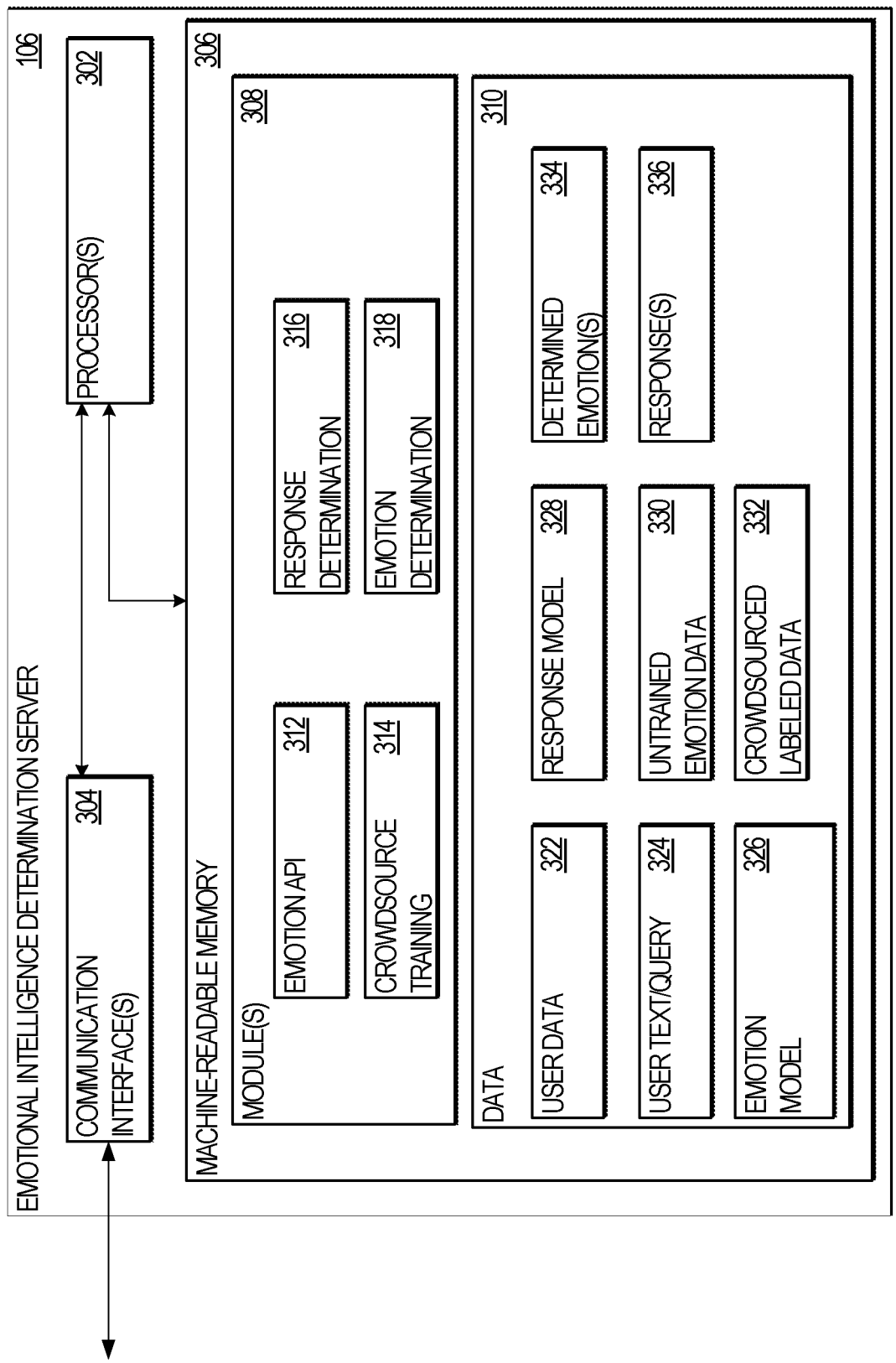
FIG. 3 is a block diagram of the emotional intelligence determination server, in accordance with an example embodiment.

FIG. 3 is a block diagram of the emotional intelligence determination server 106, in accordance with an example embodiment. In one embodiment, the emotional determination server 106 includes one or more processors 302, a communication interface 304, and a machine-readable memory 306.

The various functional components of the emotional intelligence determination server 106 may reside on a single computer, or they may be distributed across several computers in various arrangements. The various components of the emotional intelligence determination server 106 may, furthermore, access one or more databases, and each of the various components of the emotional intelligence determination server 106 may be in communication with one another. Further, while the components of FIG. 3 are discussed in the singular sense, it will be appreciated that in other embodiments multiple instances of the components may be employed.

The one or more processors 302 may be any type of commercially available processor, such as processors available from the Intel Corporation, Advanced Micro Devices, Texas Instruments, or other such processors. Furthermore, the one or more processors 302 may be of any combination of processors, such as processors arranged to perform distributed computing. In one embodiment, the one or more processors 302 are implemented as hardware processors. In another embodiment, the one or more processors 302 are implemented as software processors.

The one or more communication interface(s) 304 may be configured to send and/or receive communications with the client device 104, the unlabeled emotion database 116, and/or the labeled emotion database 118. In this regard, the communication interface 306 may be a wired interface, such as an Ethernet interface, a wireless interface, such as an 802.11g/n interface, or a combination of wired and wireless interfaces.

The machine-readable memory 306 includes various modules 308 and data 310 for implementing the features of the client device 104. The machine-readable memory 306 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 308 and the data 310. Accordingly, the machine-readable memory 306 may be implemented as a single storage apparatus or device, or, alternatively and/or additionally, as "cloud-based" storage systems or storage networks that include multiple storage apparatus or devices. As shown in FIG. 3, the machine-readable memory 306 excludes signals per se.

The module(s) 308 may include one or more applications and/or modules 312-320. As is understood by skilled artisans in the relevant computer and Internet-related arts, each of the components 312-320 (e.g., a module or engine) may represent a set of executable software instructions and the corresponding hardware (e.g., memory and processor) for executing the instructions. In one embodiment, the module(s) 308 include an emotional API 312, a crowdsource training module 314, a response determination module 316, an emotion determination module 318. In one embodiment, the modules 308 are written in a computer-programming and/or scripting language. Examples of such languages include, but are not limited to, C, C++, C #, Java, JavaScript, Perl, Python, Ruby, or any other computer programming and/or scripting language now known or later developed.

The module(s) 308 may interact with data 310 stored in the machine-readable memory 306, such as the user data 322, the user text/query 324, an emotion model 326, a response model 328, untrained emotion data 330, crowdsourced labeled data 332, one or more determination emotion(s) 334, and one or more response(s) 336. The various modules 308 and data 310 are discussed below.

The emotion API 312 is configured to provide access to one or more of the modules 314-320 executable by the emotional intelligence determination server 106. As known to one of ordinary skill in the art, an API includes one or more routines, methods, functions, protocols, and tools for building and/or executing software applications. An API specifies how software components should interact. Accordingly, the emotion API 312 provides access to various methods and/or functions of the modules 308 of the emotional intelligence determination server 106. For example, the emotion API may provide access to one or more functions of the response determination module 316 and/or one or more functions of the emotion determination module 318. With reference to FIG. 2, and in one embodiment, the emotional chatbot 220 accesses the emotion API 312 to execute the various functionalities of the modules 308 and to obtain one or more of the data 218. For example, the emotional chatbot 220 may access the emotion API 312 to obtain the user emotion 234, one or more of the response(s) 238, the chatbot emotion 236, and other such data 218.

The crowdsource training module 314 is configured to communicate the untrained emotion data 330 along with labels and/or a survey to one or more human of the operators 124 to obtain the crowdsourced labeled data 332. In one embodiment, the labels and/or survey include one or more emotion(s) associated with the untrained emotion data 330. The untrained emotion data 330 may be obtained from the unlabeled emotion database 116 and may include anonymized user data obtained from various users, such as user 108. In this regard, the untrained emotion data 330 includes user data that has yet to be associated with one or more emotions. The survey communicated to the one or more human operators 124 may include text, graphics, sound, video, or other audiovisual content to facilitate the labeling of the untrained emotion data 330. The survey may be communicated via the Internet and presented in the form of one or more webpages, where the untrained emotion data 330 forms the content for the one or more webpages. By completing the survey, and associating perceived emotions with the untrained emotion data 330, the one or more human operators 124 effectively provide the crowdsourced labeled data 332, which effectively forms the basis for a supervised machine learning algorithm. In this regard, the crowdsourced labeled data 332 includes anonymized user data, where the user data is associated with one or more emotions as assigned by the one or more human operators 124. The crowdsource training module 314 then populates the labeled emotion database 118 with the crowdsourced labeled data 332, which a supervised machine learning algorithm may then access for determining the one or more response(s) 238, the user emotion 234, and/or the chatbot emotion 236 used by the client device 104.

The response determination module 316 is configured to determine one or more response(s) 336 via a response model 328 and the user text/query 324. In one embodiment, the response determination module 316 and the response model 328 are implemented as a supervised machine learning algorithm, where the response model 328 is developed using labeled training data to formulate the response(s) 336 to the user text/query 324. In conjunction with the response determination module 316, the response model 328 may be implemented as a support vector machine (SVM), a Bayesian classifier (naïve or otherwise), a k-nearest neighbor classifier, or any other such supervised machine learning implementation or combination thereof. One example of a machine learning-based model that may be implemented by the response determination module 316 and/or the response model 328 is discussed in Prakash.

The user text/query 324 includes the one or more signals that the response determination module 316 uses to formulate the response(s) 336 to the user text/query 324. In one embodiment the response(s) 336 include one or more responses, where each response is associated with a corresponding probability (e.g., a number between 0 and 1) that the associated response is a logically correct response to the user text/query 324. In this embodiment, the response determination module 316 selects a predetermined number of responses (e.g., the top five responses) having a probability closest to one. The emotional intelligence determination server 106 then communicates these predetermined number of responses to the client device 104, which, as discussed above, may then determine one or more emotions potentially associated with the communicated response(s). Additionally, and/or alternatively, the client device 104 may request that the emotional intelligence determination server 106 also determine potential emotion(s) associated with one or more of the response(s).

The emotion determination module 318 is configured to determine one or more emotion(s) 334 via the emotion model 326 when provided with the user data 322 and/or user text/query 324 as input. As discussed above, the user data 322 may include various types of user data, such as one or more images, a video, audio data (e.g., the prosody of the user's voice), historical GPS location information, a current GPS location, biometric information, and other such user data or combination of user data. As also explained above, the type of user data that is used as signals to the emotion model 326 is data that the user 108 has authorized the emotional intelligence determination server 106 to use. The types of received user data 322 may further correspond to the types of crowdsourced labeled data 332 (e.g., retrieved from the labeled emotion database 118). In instances where the type of received user data 322 does not correspond to a type of crowdsourced labeled data (e.g., the user data 322 includes video data and the crowdsourced labeled data does not include video data), the non-corresponding user data may be stored in the unlabeled emotion database 116. Thereafter, when the emotional intelligence determination server 106 has a predetermined amount of the non-corresponding user data type, the emotional intelligence determination server 106 may then invoke the crowdsource training module 314 to disseminate the non-corresponding user data type as the untrained emotion data 330, along with various emotion labels, to be labeled by one or more of the human operators 124. In this manner, the emotional intelligence determination server 106 can be configured to manage instances where an unknown user data type is received.

In one embodiment, the emotion determination module 318 and the emotion model 326 are implemented as a supervised machine learning algorithm, where the emotion model 326 is developed using labeled training data to determine potential emotion(s) 334 to the user text/query 324. In conjunction with the emotion determination module 318, the emotion model 326 may be implemented as a support vector machine (SVM), a Bayesian classifier (naïve or otherwise), a k-nearest neighbor classifier, or any other such supervised machine learning implementation or combination thereof. One example of an implementation of the emotion determination module 318 and the emotion model 326 are the services and data structures provided by the Microsoft® Cognitive Services APIs, which is accessible using the Internet and provide a wide variety of analyzing data, whether such data is text data, speech data, image data, or combinations thereof. Thus, the emotion determination module 318 and/or the emotional model 326 may leverage the services and/or data structures that are available through the Cognitive Services APIs.

The user text/query 324 and/or the user data 322 includes the one or more signals that the emotion determination module 318 uses to determine the potential emotion(s) 334 to the user text/query 324. As explained above, the user data 322 may include one or more acquired images, the prosody of the user's voice determined and/or obtained from the user text/query 324, biometric data acquired and/or obtained from a biometric device 110 in communication with the client device 104, GPS information (including prior GPS coordinates and/or a current GPS coordinate), and other such user data 322 and/or combination of user data 322. In one embodiment the emotion(s) 334 include one or more emotions, where each emotion is associated with a corresponding probability (e.g., a number between 0 and 1) that the associated emotion is a correct emotion exhibited by the user 108 or an emotion to be assigned to the emotional chatbot 236 (e.g., where the user data 322 includes a predetermined number of prior user queries to be processed). Where one or more emotion(s) 334 are determined, the emotion determination module 318 may communicate the probabilities and/or emotion(s) 334 to the client device 104, where the emotional chatbot 220 may then select or retain those emotion(s) 334 that meet and/or exceed a probability threshold (e.g., ≥0.4). As an example, the emotion determination module 318 may determine that a given user text/query 324 and user data 322 yields the following emotions and probabilities: 0.9 for "happy," 0.6 for "excited," 0.5 for "joyful," and 0.3 for "surprised." In this example, the emotion determination module 318 may communicate each of these emotion(s) 334 and probabilities to the emotional chatbot 220 and, using the emotional probability threshold of 0.4, may retain the "happy," "excited," and "joyful" emotions. Additionally, and/or alternatively, the emotion determination module 318 may implement the emotional probability threshold and may selectively communicate those probabilities and/or emotions that meet and/or exceed the emotional probability threshold. In this embodiment, the emotion determination module 318 selectively communicates the probabilities and/or emotion(s) 334 rather than all of the determined probabilities and/or emotion(s) 334. In yet a further embodiment, the emotion determination module 318 communicates the emotion to the client device 104 having the greatest/highest probability. In this embodiment, in the event that one or more emotions are determined as having an equal probability, the emotion determination module 318 communicates each of the emotions to the client device 104 having the equal probabilities.

As explained above with reference to FIG. 2, the client device 104 may use the determined emotion(s) 334 in re-ranking one or more of the determined responses 336. The re-ranking of the responses 336 may be based on whether one or more of the emotions associated with the responses 336 are similar to the emotional state of the user and/or the emotion assigned to the emotional chatbot 220 or whether a predetermined weighting factor has been applied to the probabilities of emotions associated with the responses 336 are similar to the emotional state of the user and/or the emotion assigned to the emotional chatbot 220. As explained above, the re-ranking of the determined responses results in the emotional chatbot 220 selecting a response that is emotionally reflective of the user's emotion or of the emotion assigned to the emotional chatbot 220. This further results in the user 108 having a conversation with the emotional chatbot 220 that is more emotionally balanced and similar to a conversation that the user 108 would have with another user. Thus, this disclosure presents an advancement and technical benefit in at least one technological field, namely, artificial intelligence.

Figure 4:
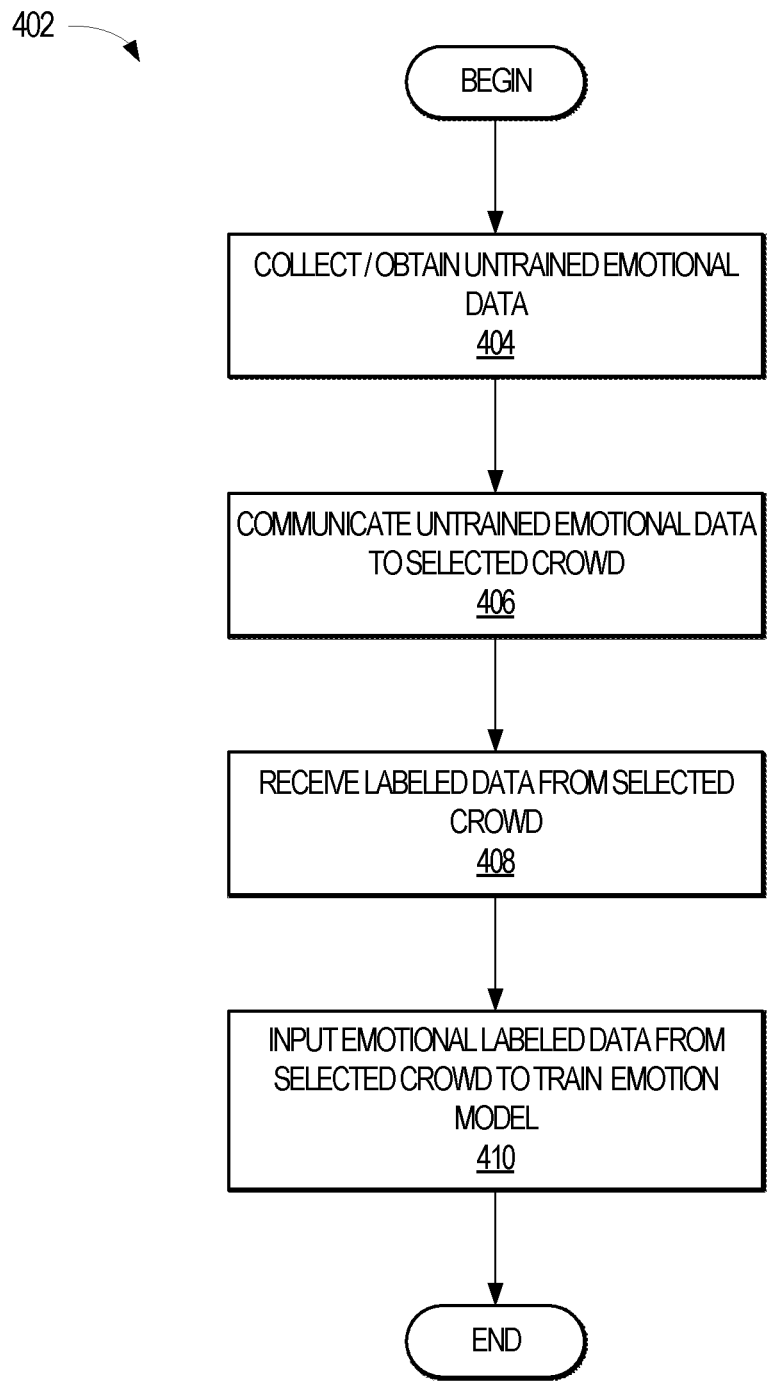
FIG. 4 illustrates a method, in accordance with an example embodiment, for obtaining labeled data for use with an emotional model leveraged by the emotional intelligence determination server of FIG. 3.

FIG. 4 illustrates a method 402, in accordance with an example embodiment, for obtaining labeled data for use with an emotional model leveraged by the emotional intelligence determination server 106 of FIG. 3. The method 402 may be implemented by one or more modules 308 of the emotional intelligence determination server 106 and is discussed by way of reference thereto.

Initially, the emotional intelligence determination server 106 collects and/or obtains untrained user data (e.g., the untrained emotion data 330) (Operation 406). The untrained user data may include the user data 228 and/or the user historical data 232. As explained above with reference to FIG. 2, as a user interacts with the client device 104 and/or the emotional chatbot 220, the client device 104 and/or the emotional chatbot 220 may collect and/or obtain user data 228 and/or user historical data 232 from the user 108. However, the client device 104 and/or the emotional chatbot 220 may be restricted from collecting certain types of user data 228 and/or user historical data 232 by the user 108, such as through one or more configuration preferences 240, which the user 108 may modify during his or her interactions with the client device 104 and/or the emotional chatbot 220. Thus, the client device 104 and/or the emotional chatbot 220 may be restricted to collecting only that user data 228 and/or only that user historical data 232 that the client device 104 and/or the emotional chatbot 220 is authorized to collect. Furthermore, in communicating the user data 228 and/or user historical data 232 to the emotional intelligence determination server 106, the collected user data 228 and/or the collected user historical data 232 may be anonymized such that the user data 228 and the user historical data 232 is not attributable to any one person nor may any one person be identified with such collected user data 228 or user historical data 232. In one embodiment, the collected user data 228 and/or user historical data 232 is stored in the unlabeled emotion database 116 communicatively coupled to the emotional intelligence determination server 106. In this manner, the collected user data 228 and/or user historical data 232 forms the basis for untrained emotion data.

The emotional intelligence determination server 106 may then disseminate the untrained emotion data from the unlabeled emotion database 116 to one or more human operators 124 via the crowdsource training module 314 (Operation 406). As explained above, the untrained emotion data may be disseminated along with a survey having various emotion labels to the one or more human operations 124, which requests that the one or more human operators 124 pair the untrained emotion data with the one or more emotion labels. As the one or more human operators 124 apply the emotion labels to the untrained emotion data, the untrained emotion data is transformed to trained/labeled emotion data (e.g., the crowdsourced label data 332). As the surveys are completed by the one or more human operators 124, the completed surveys (in whole or in part) are then communicated back to the emotional intelligence determination server 106, which then stores such labeled emotion data in the labeled emotion database 118 (Operation 408). As known to one of ordinary skill in the art, the labeled emotion data is then used by the emotional intelligence determination server 106 (via the emotion determination module 318) to train an emotion model 326 (Operation 410). As explained above with reference to FIG. 3, the emotion determination module 318 and the emotion model 326 may be implemented as a supervised machine learning algorithm, which determines potential emotion(s) of the user 108 and/or the emotional chatbot 220 using received user data, received user historical data, and/or a received user query.

Figure 5A:
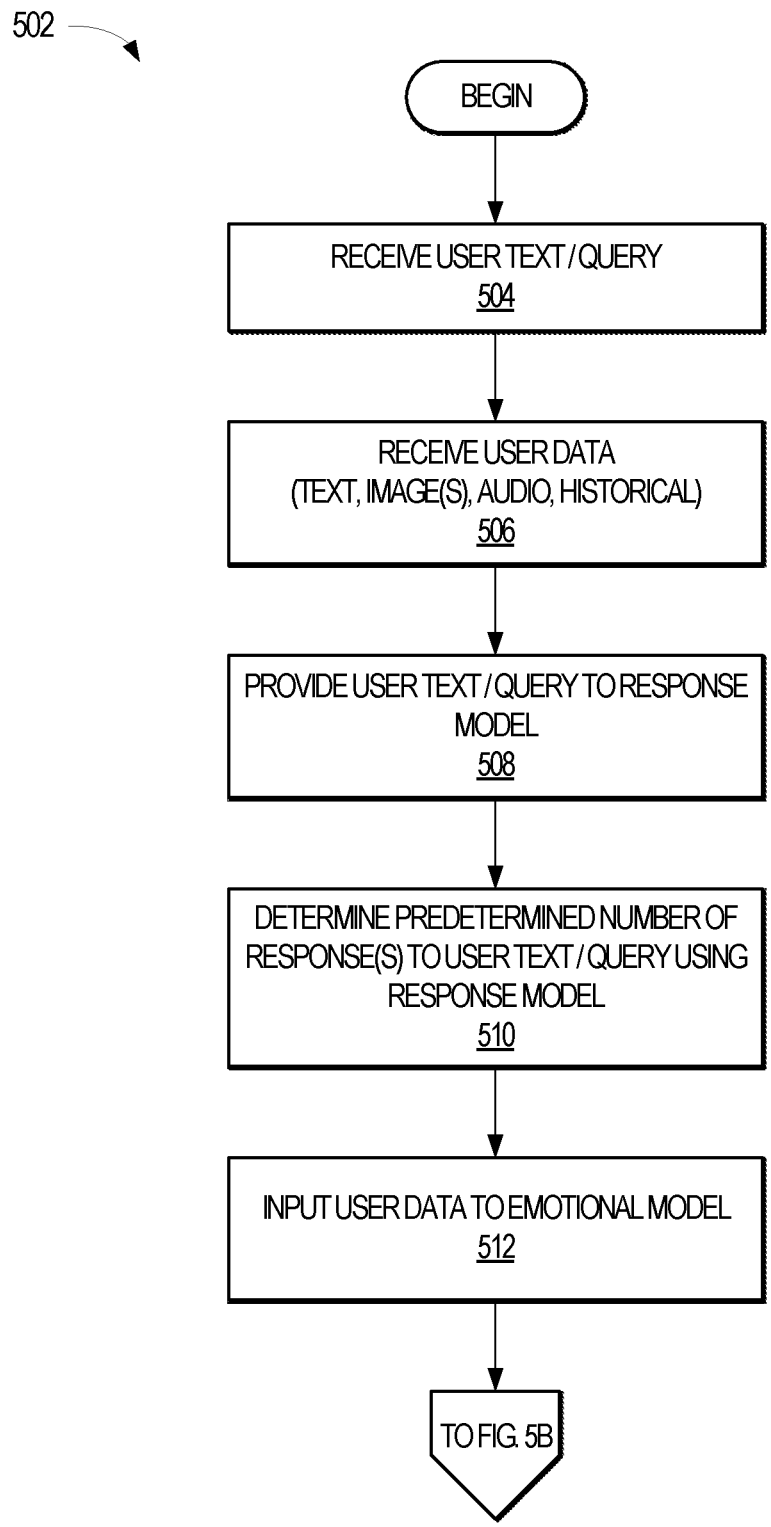
FIGS. 5A-5B illustrate a method, in accordance with an example embodiment, for determining an emotional state of the user based on various user data.
Figure 5B:
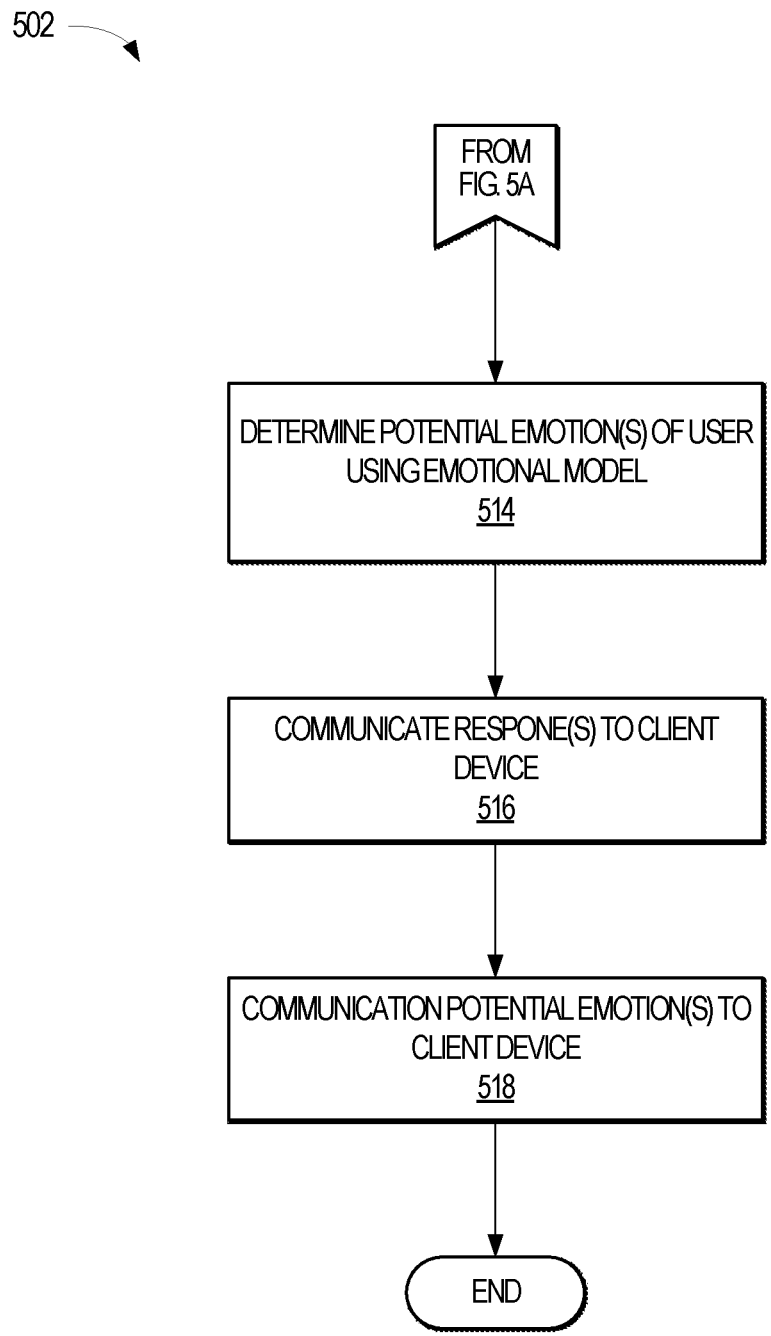

FIGS. 5A-5B illustrate a method 502, in accordance with an example embodiment, for determining an emotional state of the user 108 based on various user data. The method 502 may be implemented by one or more modules 216 of the client device 104 and/or one or more modules 308 of the emotional intelligence determination server 106, and is discussed by way of reference thereto.

Referring to FIG. 5A, the client device 104 (via the emotional chatbot 220) initially receives a user query 230. The user query 230 may include voice data (e.g., speech), text, one or more mouse movements or actions (e.g., a button click), or any other such input data. The user query 230 may be a question for the emotional chatbot 220 to answer or a command the emotional chatbot 220 is to perform. In addition to the user query 230, the client device 104 (via the emotional chatbot 220) also collects and/or obtains user data 228 and/or user historical data 232 that the client device 104 and/or the emotional chatbot 220 is authorized to collect and/or obtain (Operation 506). As explained above, the client device 104 may include one or more configuration preferences 240 that authorize or not authorize the client device 104 and/or the emotional chatbot 220 to collect or not collect.

The client device 104 then communicates the received user query 230 to the emotional intelligence determination server 106, which provides the received user query 230 as input to the response determination module 316 and the response model 328 (Operation 508). From the response determination module 316 and the response model 328, the emotional intelligence determination server 106 obtains a predetermined number of response(s) 336 (Operation 510). In one embodiment, the predetermined number of response(s) 336 include ranked responses, where the ranking corresponds to the likelihood that the response answers and/or addresses the user query 230.

As explained above, in addition to the response(s) 336, the emotional intelligence determination server 106 also obtains a predetermined number of emotion(s) 334 that are likely to be associated with the user data 322 acquired by the client device 104. In one embodiment, the user data 322 is provided as input to the emotion determination module 318 and the emotion model 326 (Operation 512), which determines the predetermined number of emotion(s) 334 (Operation 514). As explained above, the user data 322 includes information about the user, information about the user query, user GPS data (current and/or historical), biometric data, and other such user data and/or combinations of user data. In some instances, where user data 322 is received that does not have a corresponding type in the emotion model 326, such user data 322 may be stored as untrained emotion data 330, and further stored in the unlabeled emotion database 116 for later labeling by one or more human operators 124 via the crowdsource training module 314.

Referring next to FIG. 5B, the emotional intelligence determination server 106 then communicates the determined emotion(s) 334 and the response(s) 336 to the client device 104 (Operations 516-518). As discussed below with reference to FIGS. 6A-6B, and in one embodiment, the determined emotion(s) 334 are then used by the client device 104 to re-rank the response(s) 336.

In some instances, the emotional intelligence determination server 106 provides only the determined emotion(s) 334 or the determined response(s) 336. The emotional intelligence determination server 106 may only provide the determined emotion(s) 334 where the client device 104 has requested that the emotional intelligence determination server 106 specifically determine such emotions. In this instance, the client device 104 may not provide an instruction to the emotional intelligence determination server 106 to determine the response(s) 336. Similarly, the emotional intelligence determination server 106 may only provide the determined response(s) 336 where the client device 104 has requested that the emotional intelligence determination server 106 specifically determine such responses. In this instance, the client device 104 may not provide an instruction to the emotional intelligence determination server 106 to determine the emotion(s) 334.

Figure 6A:
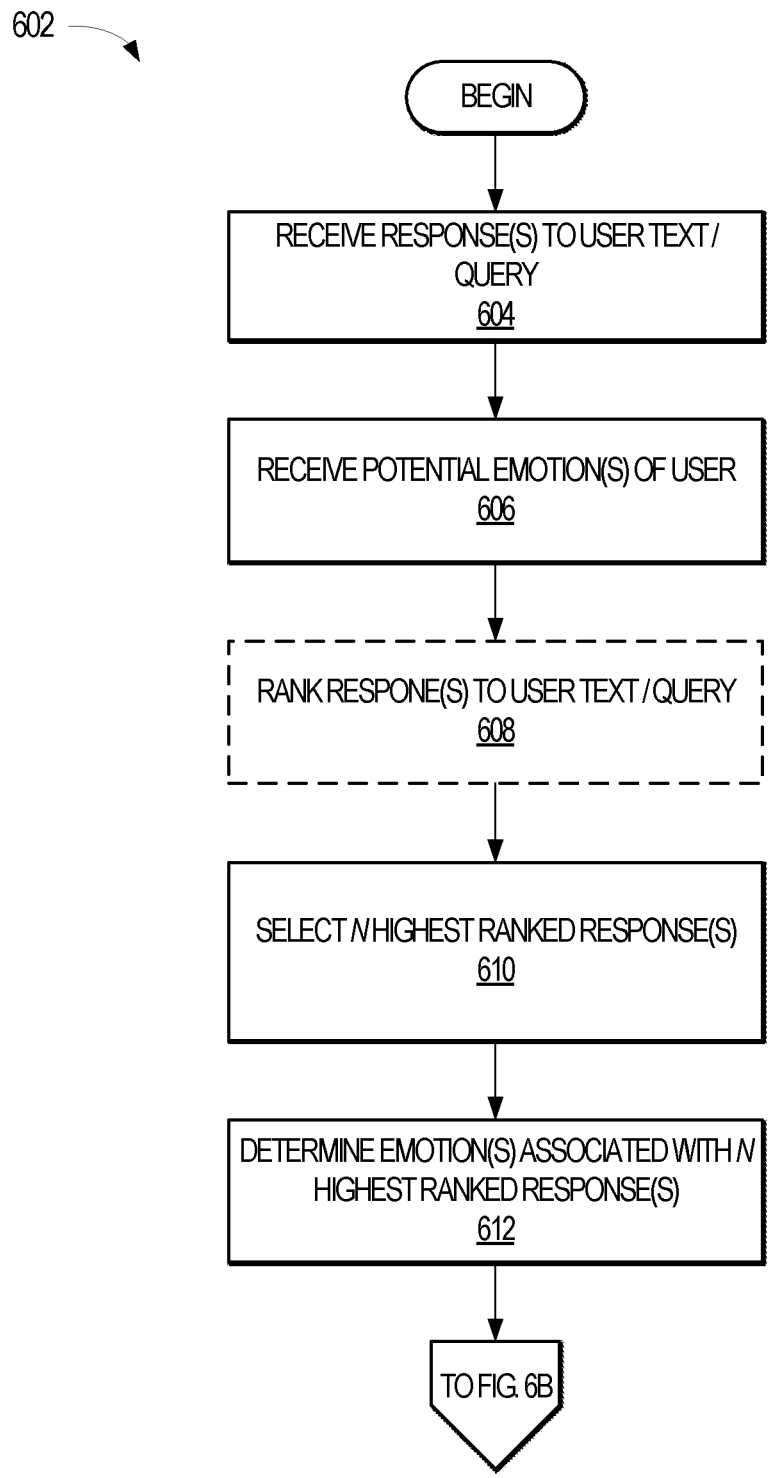
FIGS. 6A-6B illustrate a method, in accordance with an example embodiment, for providing an emotionally relevant response via the client device of FIG. 1 in reply to a user query.
Figure 6B:
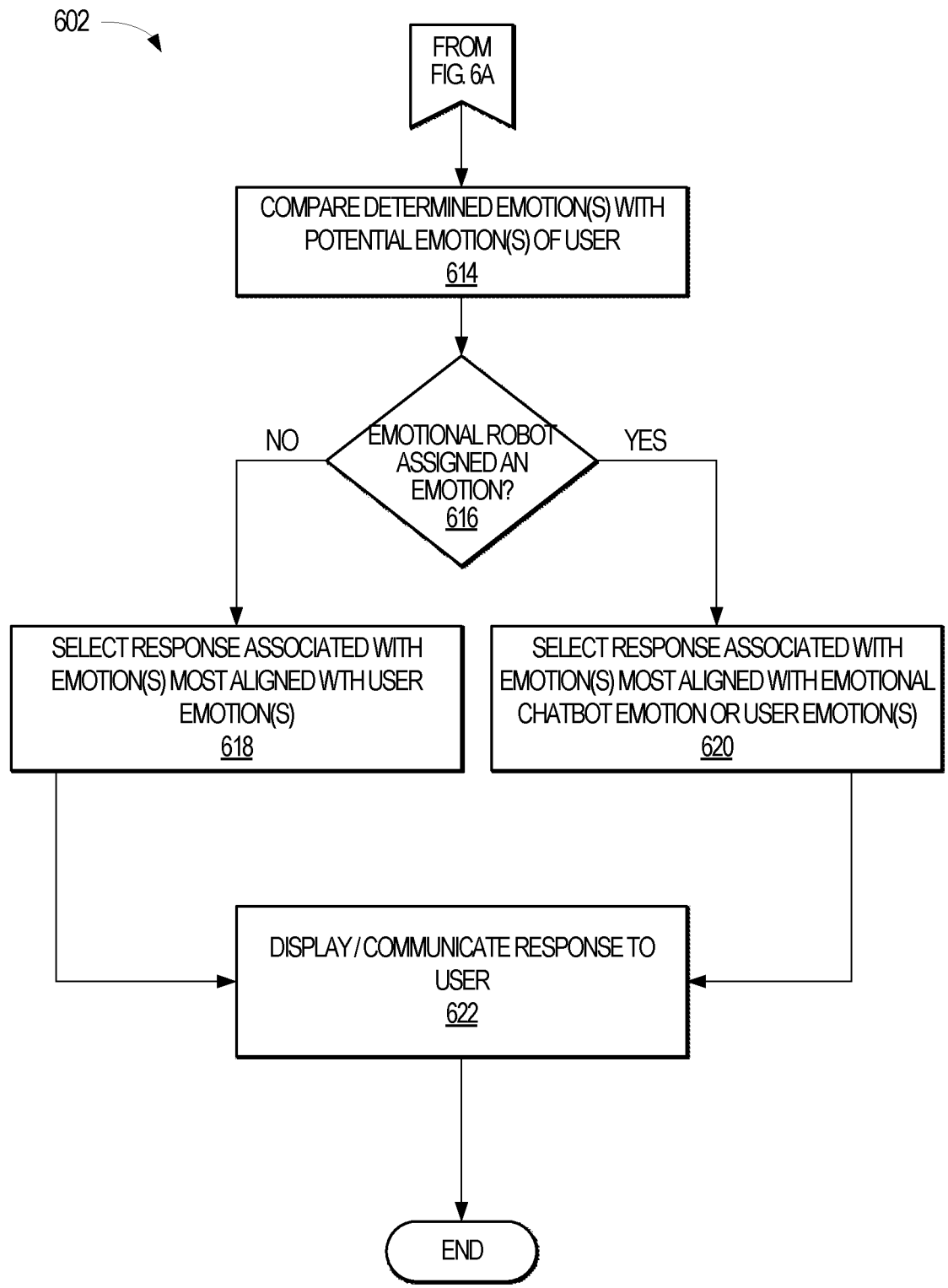

FIGS. 6A-6B illustrate a method 602, in accordance with an example embodiment, for providing an emotionally relevant response via the client device 104 of FIG. 1 in reply to a user query 230. Referring to FIG. 6A, the client device 104 initially receives the one or more response(s) 336 from the emotional intelligence determination server 106, which are stored as the response(s) 238 (Operation 604). In one embodiment, the response(s) 238 are ranked (or associated with a ranking) by the emotional intelligence determination server 106. In another embodiment, the client device 104 ranks the response(s) 238. In addition to the response(s) 238, the client device 104 also receives the determined emotion(s) 334 and stores such determined emotion(s) 334 as either the user emotion 234 or the chatbot emotion 236, depending on whether the client device 104 requested the emotional intelligence determination server 106 to determine potential emotions for the user 108 or for the emotional chatbot 220 (or a combination thereof).

Depending on whether the response(s) 238 were ranked by the emotional intelligence determination server 106, the client device 104 may then rank the response(s) 238 (Operation 608). Operation 608 is illustrated with dashed lines as this step may be optionally performed by the client device 106.

To rank the response(s) 238, the client device 104 may be configured with a response model (not shown in FIG. 2) that, like the emotional intelligence determination server 106, is configured to determine and/or rank responses to the user query 230. The response model of the client device 104 may be obtained (e.g., copied from) from the emotional intelligence server 106 such that the client device 106 may provide responses to the user query 230 in the event there is no connectivity between the client device 104 and the emotional intelligence determination server 106.

With the ranked response(s) 238 (either obtained from the emotional intelligence determination server 106 or ranked by the client device 104), the client device 104 then selects a predetermined number of responses that are the best N responses, where N is greater than or equal to a predetermined number (e.g., one, three, five, etc.) (Operation 610). Additionally, and/or alternatively, the client device 104 may select those response(s) 238 that meet or exceed a predetermined response probability threshold, such as 0.8 (e.g., indicating that the response is most likely relevant to the user text and/or query 230.) The client device 104 then determines those emotions that are likely associated with the selected responses (Operation 612). As explained, and in one embodiment, the emotion analyzer 226 may determine the one or more emotions associated with each of the response(s) 238.

Referring to FIG. 6B, the client device 104 then compares the emotions determined by the emotion analyzer 226 with the potential user emotions 234. In one embodiment, the response ranking module 224 is configured to rank the responses according to the probabilities associated with each of the determined emotion(s) as determined by the emotion analyzer 226.

At Operation 616, the emotional chatbot 220 determines whether it has been assigned a chatbot emotion 236 by the emotional assignment module 222. For example, the emotional chatbot 220 may determine whether the chatbot emotion 236 is a NULL value or a value associated with a particular emotion. In this embodiment, the determination of whether the emotional chatbot 220 has been assigned a chatbot emotion 220 may affect the response communicated to the user 108. For example, where the emotional chatbot 220 determines that an emotion has been assigned to the emotional chatbot 220 (e.g., the "YES" branch of Operation 616), the emotional chatbot 220 selects the highest ranked response(s) that is associated with one or more emotions that most align with the chatbot emotion 236 or the determined user emotion 234 (Operation 620). Alternatively, where the emotional chatbot 220 determines that an emotion has not been assigned (e.g., the "NO" branch of Operation 616), the emotional chatbot 220 selects the highest ranked response(s) that is associated with one or emotions that most align with the user emotion 234 (Operation 618).

In one embodiment, selecting a response in either Operation 618 or Operation 620 is dependent on the ranking of the responses according to whether the emotions associated with the responses are more similar to the determined user emotion 234 or the determined chatbot emotion 236. As explained above, when a set of emotions are determined for a set of response(s) 238, the determined emotions are compared with the user emotion 234 and/or the chatbot emotion 236, and the response ranking module 224 ranks those responses higher where their corresponding emotions are determined to be similar to as the user emotion 234 and/or the chatbot emotion 236. In performing this ranking, the response ranking module 224 may first rank the response(s) 238 according to whether their corresponding emotions are similar to the user emotion 234 and/or chatbot emotion 236, and then according to the probability associated with such emotions. Additionally, and/or alternatively, probabilities of the emotions that are determined as being similar to the user emotion 234 are multiplied with a first predetermined weighting factor and probabilities of the emotions that are determined as being similar to the chatbot emotion 236 are multiplied with second predetermined weight factor. Where the emotion of a selected response is not similar to the user emotion 234 and/or chatbot emotion 236, there may be no weighting factor applied. Furthermore, the first and second weighting factors may be different, such that the first weighting factor is greater than the second weighting factor (or vice versa). In this manner, the weighting of the probabilities of the emotions associated with the response(s) 238 may affect the re-ranking of such response(s) 238.

The emotional chatbot then selects the highest ranked response from the response(s) 238, where the ranking is dependent on the emotion(s) associated with the highest ranked response. This selected response is then communicated (e.g., displayed, verbally communicated, or a combination thereof) to the user 108 (Operation 622).

Figure 7A:
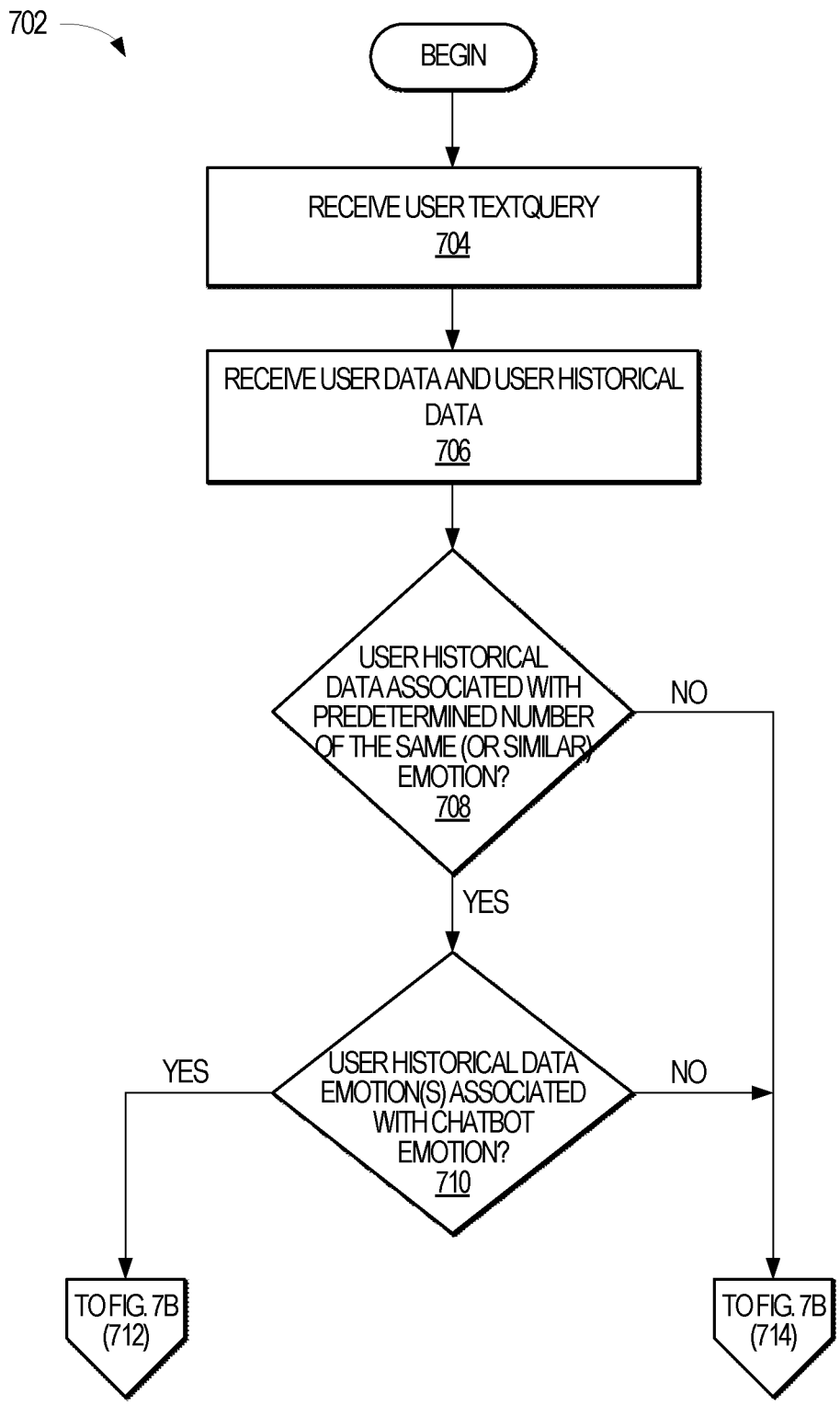
FIGS. 7A-7B illustrate a method, in accordance with an example embodiment, for determining an emotional state of the emotional chatbot instantiated by the client device of FIG. 1.
Figure 7B:
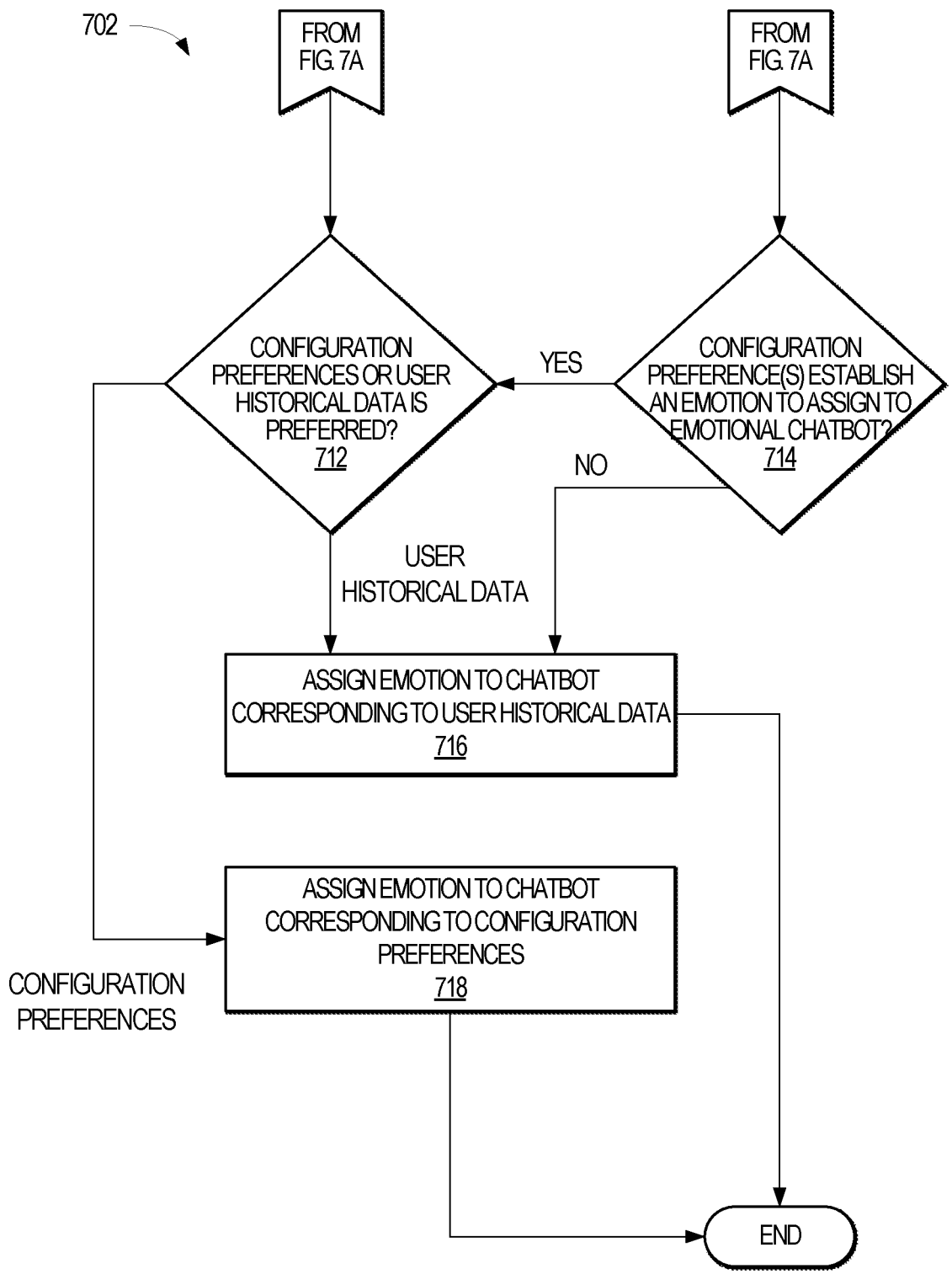

FIGS. 7A-7B illustrate a method 702, in accordance with an example embodiment, for determining an emotional state of the emotional chatbot 220 instantiated by the client device 104 of FIG. 1. The method 702 may be implemented by one or more modules 216 illustrated in FIG. 2 and is discussed by way of reference thereto.

Referring to FIG. 7A, the method 702 proceeds similarly and/or simultaneously as the method 602 in that the emotional chatbot 220 initially receives the user text/query 230 (Operation 704) and user historical data 232 (Operation 706). In one embodiment, the emotional assignment module 222 determines whether to assign an emotional state to the emotional chatbot 220 by analyzing the user historical data 232, which may include one or more prior user queries and/or response(s), and identifying the emotions previously associated with those prior user queries and/or responses. In this context, a user query is associated with the user emotion 234 at the time the user query was received. Thus, for each user query stored in the user historical data 232, the user query is associated with the user emotion 234 determined at the time the user query was received (e.g., via a two-dimensional table, array, or the like).

Further still, in this embodiment, the emotional assignment module 222 may analyze the user historical data 232 within a predetermined time period, such as minutes, hours, days, or other measurements of time. As one example, the emotional assignment module 222 may analyze the user historical data 232 within a 10-minute window (or other defined window of time), beginning with the time that the user query was received and ending at a time N (in this example, ten) minutes prior to such received user query (thereby defining the 10-minute window).

Where the number of emotions are equal to, and/or similar to (by being within the same emotional cluster), a threshold value for a predetermined emotion (which may be defined by the configuration preferences 240), the method 702 proceeds to Operation 710. By way of example, the configuration preferences 240 may establish that the emotional chatbot 220 is to be assigned an emotion in response to a determination that the user historical data 232 includes five user queries associated with the emotion "angry." In this example, suppose that the user historical data 232 (defined by a predetermined time window) includes 15 user queries, where there are five user queries associated with a "happy" emotion, four user queries associated with a "sad" emotion, and six user queries associated with an "angry" emotion. As the number of user queries associated with the "angry" emotion meets or exceeds the predetermined threshold of five user queries associated with the "angry" emotion, the emotional assignment module 222 then references the configuration preference(s) to assign an emotional state (e.g., the chatbot emotion 236) to the emotional chatbot 220.

Although the foregoing example employs a predetermined threshold to the user historical data 232, alternative embodiments may employ more sophisticated means for analyzing the user historical data 232. For example, the data 218 may include an emotional chatbot emotion model that, having been trained via the crowdsource training module 314 and communicated to the client device 104, determines an emotion to assign to the emotional chatbot 220 given the user historical data 232. Like the emotion determination model 318 and the emotion model 326, this emotional chatbot emotion model may also be implemented as a supervised machine learning algorithm that is configured with labeled data in the form of labeled user historical data (e.g., prior user queries and/or their associated emotions). Thus, the emotional assignment module 222 may leverage this model in determining an emotional state for the emotional chatbot 220 alternatively, and/or in addition to, the predetermined threshold approach.

At Operation 710, the emotional assignment module 222 then determines and/or selects the emotion to be assigned to the emotional chatbot 220 given the user historical data 232 and the emotions that exceed the predetermined threshold (Operation 710). If there is no emotion to assign to the emotional chatbot 220 (e.g., the "NO" branch of Operation 710), the method 702 then proceeds to Operation 714 on FIG. 7B. In contrast, if there is an emotion to assign to the emotional chatbot 220 (e.g., the "YES" branch of Operation 710), the method 702 then proceeds to Operation 714 on FIG. 7B.

Referring to FIG. 7B, at Operation 714, the emotional assignment module 222 references the configuration preferences 240 to determine whether one or more of the configuration preferences provide one or more conditions which, when satisfied, assign an emotion to the emotional chatbot 220. For example, one predetermined condition may be established that "IF (the weather forecast predicts rain) THEN (assign a 'sad' emotion to the emotional chatbot 220)." In this example, the weather forecast may be obtained via the communication interface(2) 206 and communicating with one or more websites that provide such information. Using this, and/or other similar conditions, the configuration preferences 240 may define which emotions are assigned to the emotional chatbot 220 upon the satisfaction of such conditions.

Where the configuration preferences 240 establish conditions for assigning an emotion to the emotional chatbot 220 (e.g., the "YES" branch of Operation 714), the method 702 then further proceeds to Operation 712. Alternatively, where there configuration preferences 240 do not establish conditions for assigning an emotion to the emotional chatbot 220 or where none of the conditions are satisfied (e.g., the "NO" branch of Operation 716), the method 702 proceeds to Operation 716.

Referring back to Operation 708, should the emotional assignment module 222 determine that the user historical data 232 is not associated with a predetermined number of emotions (e.g., the "NO" branch of Operation 708), the method 702 proceeds to Operation 714 on FIG. 7B.

At Operation 712, the emotional assignment module 222 engages in a conflict resolution to determine which emotion to apply should there be a determined emotion given the user historical data 232 and one or more conditions have been satisfied that indicate that an emotion should be assigned to the emotional chatbot 220. In one embodiment, the configuration preferences 240 indicate which emotion should be assigned given one or more mechanisms by which an emotion is determined for the emotional chatbot 220. For example, the configuration preferences 240 may indicate that the emotion determined according to the satisfaction of one or more conditions of the configuration preferences 240 should be assigned (e.g., the "CONFIGURATION PREFERENCES" branch of Operation 712). In which case, the emotional assignment module 222 assigns the emotion that was determined from satisfying one or more conditions of the configuration preferences 240 as the chatbot emotion 236 (Operation 716). Alternatively, where the configuration preferences 240 indicate that the emotion determined from the user historical data 232 should be assigned to the emotional chatbot 220 (e.g., the "USER HISTORICAL DATA" branch of Operation 712), the emotional assignment module 222 assigns the emotion determined from the user historical data 232 (Operation 718). As discussed above, the emotional chatbot 220 may then use the chatbot emotion 236 in determining which of the response(s) 238 to present to the user 108.

In this manner, this disclosure provides for an emotional chatbot 220 instantiated, or accessible from, a client device 104, where the emotional chatbot 220 is emotionally responsive to one or more queries provided by a user 108. Unlike other interactive systems that may employ an automated query and answer system, the disclosed emotional chatbot 220 also provides responses that are emotionally relevant to the user 108 and/or the emotional chatbot 220. The user 108 thus feels like he or she is engaging with another person rather than a computer or other automata. As the emotional chatbot 220 presents an advancement in how a user may interact with his or her computer, this disclosure provides an advancement in human/machine interfaces and artificial intelligence.

Modules, Components, and Logic

Certain embodiments are described herein as including logic or a number of components, modules, or mechanisms.

Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 8:
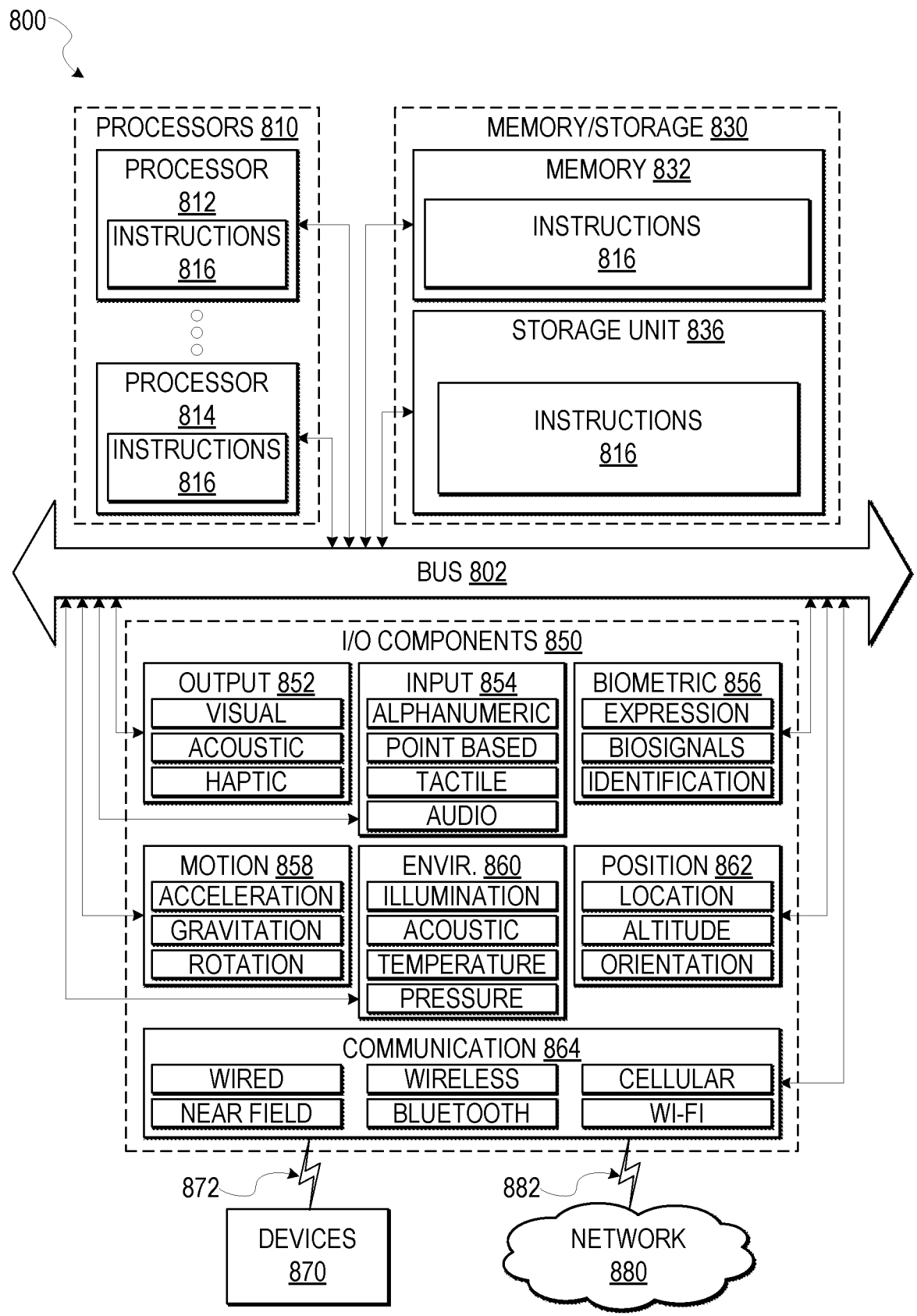
FIG. 8 is a diagrammatic representation of a machine in the example form of a computer system within which a set of instructions for causing the machine to perform any one or more of the methodologies discussed herein may be executed.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 1002 illustrated in FIGS. 4-7B. Additionally, or alternatively, the instructions 816 may implement one or more of the modules 216 illustrated in FIG. 2 and the modules 308 illustrated in FIG. 3 and so forth. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include a multi-core processor that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system for providing emotionally and intellectually relevant responses to one or more user queries, the system comprising:
a machine-readable medium storing computer-executable instructions; and
one or more hardware processors that, having executed the computer-executable instructions, configures the system to:
receive a user query for a chatbot instantiated by a computing device, the user query comprising a natural language question to be answered or a natural language command for a computing device to perform;
receive an image of a user associated with the user query;
communicate the user query to a first supervised machine learning model to obtain a first plurality of responses to the received user query, the first plurality of responses having a first ranking that indicates the relevancy of the response to the user query;
communicate the received image to a second supervised machine learning model to obtain a first plurality of emotions associated with the user image, each of the emotions of the first plurality of emotions having an associated first probability that the user that provided the user query possesses the corresponding emotion;
determine, by a third supervised machine learning model, a second plurality of emotions for the first plurality of responses, wherein each response is associated with at least one emotion of the second plurality of emotions, the second plurality of emotions having an associated second probability that the response possesses the corresponding emotion;
re-rank the first plurality of responses based on a comparison of the first and second probabilities and the first and second plurality of emotions, including re-ranking a response of the first plurality of responses that is not ranked highest to be ranked highest if the highest ranked response of the plurality of responses is associated with an emotion of the second plurality of emotions that does not match the highest probability emotion of the first plurality of emotions and the second plurality of emotions, respectively, to obtain a second plurality of responses having a second ranking, wherein a first response of the first plurality of responses with an associated second probability that is not highest among the second probabilities, is re-ranked highest in the second plurality of responses if the emotion of the first response matches the highest probability emotion of the user and the response includes a relevancy above a specified threshold;
select the highest ranked response to the user query from the second plurality of responses; and
output the selected response using the chatbot instantiated by the computing device.

2. The system of claim 1, wherein the system is further configured to:
determine an emotional state of the chatbot instantiated by the computing device; and
wherein the selection of the response from the second plurality of responses is further based on the emotional state for the chatbot.

3. The system of claim 2, wherein the user data comprises a plurality of prior user queries previously received by the chatbot during a predetermined time window, each of the prior user queries being associated with at least one emotion; and
the emotional state of the chatbot is determined by determining whether the emotions of the prior user queries meet or exceed an emotional threshold for a predetermined emotion.

4. The system of claim 2, wherein the system is further configured to:
obtain contextual data identified by a Uniform Resource Location defined by a configuration preference of the chatbot; and
the emotional state of the chatbot is determined by determining whether one or more predetermined conditions have been satisfied using the obtained contextual data.

5. The system of claim 2, wherein the system is further configured to:
apply a first predetermined weighting factor to one or more of the second plurality of emotions based on a comparison of the second plurality of emotions with the first plurality of emotions;
apply a second predetermined weighting to one or more of the second plurality of emotions based on a comparison of the second plurality of emotions with the emotional state of the chatbot; and
the re-ranking of the first plurality of responses is further based on the applied first predetermined weighting factor and the applied second predetermined weighting factor.

6. The system of claim 1, wherein the second ranking of the second plurality of responses causes at least one response of the second plurality of responses to be ranked differently than the same response in the first plurality of responses.

7. The system of claim 1, wherein the user data is associated with an authorization from the user, the authorization indicating the types of user data that can be used in obtaining the first plurality of emotions.

8. A method for providing emotionally and intellectually relevant responses to one or more user queries, the method comprising:
receiving a user query for a chatbot instantiated by a computing device, the user query comprising a natural language question to be answered or a natural language command for a computing device to perform;
receiving an image of a user associated with the user query;
communicating the user query to a first supervised machine learning model to obtain a first plurality of responses to the received user query, the first plurality of responses having a first ranking that indicates the relevancy of the response to the user query;
communicating the received image to a second supervised machine learning model to obtain a first plurality of emotions associated with the user image, each of the emotions of the first plurality of emotions having an associated first probability that the user that provided the user query possesses the corresponding emotion;
determining, by a third supervised machine learning model, a second plurality of emotions for the first plurality of responses, wherein each response is associated with at least one emotion of the second plurality of emotions, the second plurality of emotions having an associated second probability that the response possesses the corresponding emotion;

re-ranking the first plurality of responses based on a comparison of the first and second probabilities and the first and second plurality of emotions, including re-ranking a response of the first plurality of responses that is not ranked highest to be ranked highest if the highest ranked response of the plurality of responses is associated with an emotion of the second plurality of emotions that does not match the highest probability emotion of the first plurality of emotions and the second plurality of emotions, respectively, to obtain a second plurality of responses having a second ranking, wherein a first response of the first plurality of responses with an associated second probability that is not highest among the second probabilities, is re-ranked highest in the second plurality of responses if the emotion of the first response matches the highest probability emotion of the user and the response includes a relevancy above a specified threshold;

selecting the highest ranked response to the user query from the second plurality of responses; and outputting the selected response using the chatbot instantiated by the computing device.

9. The method of claim 8, further comprising:

determining an emotional state of the chatbot instantiated by the computing device; and wherein the selection of the response from the second plurality of responses is further based on the emotional state for the chatbot.

10. The method of claim 9, wherein the user data comprises a plurality of prior user queries previously received by the chatbot during a predetermined time window, each of the prior user queries being associated with at least one emotion; and the emotional state of the chatbot is determined by determining whether the emotions of the prior user queries meet or exceed an emotional threshold for a predetermined emotion.

11. The method of claim 9, further comprising:

obtaining contextual data identified by a Uniform Resource Location defined by a configuration preference of the chatbot; and the emotional state of the chatbot is determined by determining whether one or more predetermined conditions have been satisfied using the obtained contextual data.

12. The method of claim 9, further comprising:

applying a first predetermined weighting factor to one or more of the second plurality of emotions based on a comparison of the second plurality of emotions with the first plurality of emotions;

applying a second predetermined weighting to one or more of the second plurality of emotions based on a comparison of the second plurality of emotions with the emotional state of the chatbot; and the re-ranking of the first plurality of responses is further based on the applied first predetermined weighting factor and the applied second predetermined weighting factor.

13. The method of claim 8, wherein the second ranking of the second plurality of responses causes at least one response of the second plurality of responses to be ranked differently than the same response in the first plurality of responses.

14. The method of claim 8, wherein the user data is associated with an authorization from the user, the authorization indicating the types of user data that can be used in obtaining the first plurality of emotions.

15. A non-transitory, machine-readable medium having computer-executable instructions stored thereon that, when executed by one or more hardware processors, cause the one or more hardware processors to perform a plurality of operations comprising:

receiving a user query for a chatbot instantiated by a computing device, the user query comprising a natural language question to be answered or a natural language command for a computing device to perform;

receiving an image of a user associated with the user query;

communicating the user query to a first supervised machine learning model to obtain a first plurality of responses to the received user query, the first plurality of responses having a first ranking that indicates the relevancy of the response to the user query;

communicating the received image to a second supervised machine learning model to obtain a first plurality of emotions associated with the user image, each of the emotions of the first plurality of emotions having an associated first probability that the user that provided the user query possesses the corresponding emotion;

determining, by a third supervised machine learning model, a second plurality of emotions for the first plurality of responses, wherein each response is associated with at least one emotion of the second plurality of emotions, the second plurality of emotions having an associated second probability that the response possesses the corresponding emotion;

re-ranking the first plurality of responses based on a comparison of the first and second probabilities and the first and second plurality of emotions, including re-ranking a response of the first plurality of responses that is not ranked highest to be ranked highest if the highest ranked response of the plurality of responses is associated with an emotion of the second plurality of emotions that does not match the highest probability emotion of the first plurality of emotions and the second plurality of emotions, respectively, to obtain a second plurality of responses having a second ranking, wherein a first response of the first plurality of responses with an associated second probability that is not highest among the second probabilities, is re-ranked highest in the second plurality of responses if the emotion of the first response matches the highest probability emotion of the user and the response includes a relevancy above a specified threshold;

selecting the highest ranked response to the user query from the second plurality of responses; and outputting the selected response using the chatbot instantiated by the computing device.

16. The non-transitory, machine-readable medium of claim 15, wherein plurality of operations further comprises:

determining an emotional state of the chatbot instantiated by the computing device; and wherein the selection of the response from the second plurality of responses is further based on the emotional state for the chatbot.

17. The non-transitory, machine-readable medium of claim 16, wherein the user data comprises a plurality of prior user queries previously received by the chatbot during a predetermined time window, each of the prior user queries being associated with at least one emotion; and the emotional state of the chatbot is determined by determining whether the emotions of the prior user queries meet or exceed an emotional threshold for a predetermined emotion.

18. The non-transitory, machine-readable medium of claim 16, wherein the plurality of operations further comprises:
- obtaining contextual data identified by a Uniform Resource Location defined by a configuration preference of the chatbot; and
- the emotional state of the chatbot is determined by determining whether one or more predetermined conditions have been satisfied using the obtained contextual data.

19. The non-transitory, machine-readable medium of claim 16, wherein the plurality of operations further comprises:
- applying a first predetermined weighting factor to one or more of the second plurality of emotions based on a comparison of the second plurality of emotions with the first plurality of emotions;
- applying a second predetermined weighting to one or more of the second plurality of emotions based on a comparison of the second plurality of emotions with the emotional state of the chatbot; and
- the re-ranking of the first plurality of responses is further based on the applied first predetermined weighting factor and the applied second predetermined weighting factor.

20. The non-transitory, machine-readable medium of claim 16, wherein the second ranking of the second plurality of responses causes at least one response of the second plurality of responses to be ranked differently than the same response in the first plurality of responses.

* * * * *